United States Patent
Kuroda et al.

(10) Patent No.: US 8,040,868 B2
(45) Date of Patent: Oct. 18, 2011

(54) COMMUNICATION SYSTEM, COMMUNICATION METHOD, MOBILE STATION AND BASE STATION USED FOR THE SAME

(75) Inventors: Nahoko Kuroda, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1055 days.

(21) Appl. No.: 11/772,894

(22) Filed: Jul. 3, 2007

(65) Prior Publication Data

US 2008/0045231 A1 Feb. 21, 2008

(30) Foreign Application Priority Data

Aug. 21, 2006 (JP) .................................. 2006-224040

(51) Int. Cl.
*H04B 7/212* (2006.01)
(52) U.S. Cl. ..................... 370/345; 370/463; 455/452.2; 455/451
(58) Field of Classification Search .................. 370/343; 455/452.1, 425, 452, 2, 561, 67.11
See application file for complete search history.

(56) References Cited

U.S. PATENT DOCUMENTS

| | | | |
|---|---|---|---|
| 4,897,855 A | 1/1990 | Acampora | |
| 7,526,292 B2 * | 4/2009 | Kim et al. ...................... | 455/450 |
| 7,630,356 B2 * | 12/2009 | Zhang et al. ................... | 370/344 |
| 2004/0141466 A1 | 7/2004 | Kim et al. | |
| 2007/0032199 A1 * | 2/2007 | Chang et al. ................... | 455/69 |
| 2007/0242770 A1 * | 10/2007 | Kim et al. ...................... | 375/267 |
| 2010/0195707 A1 * | 8/2010 | Duan et al. ..................... | 375/227 |

FOREIGN PATENT DOCUMENTS

| | | |
|---|---|---|
| JP | 2004-032176 A | 1/2004 |
| KR | 10-2004-0102198 A | 12/2004 |
| WO | 2006/059566 A1 | 6/2006 |

OTHER PUBLICATIONS

3GPP TR 25.814 v1.2.0 (Feb. 2006), Technical Report, 3rd Generation Partnership Project; Technical Specification Group Radio Access Network; Physical Layer Aspects for Evolved UTRA (Release 7).
Partial European Search Report, dated Jul. 4, 2011, issued in Application No. 07075707.5.
"CQI Reporting", 3GPP TSG RAN WG1 Meeting #45, Draft; R1-061312, 3rd Generation Partnership Project (3GPP), Shanghai, China, May 2, 2006 XP050102190, 4 pages.
"Compressed CQI Reporting Scheme", 3GPP TSG RAN Meeting #54, Draft; R2-062490, 3rd Generation Partnership Project (3GPP), Tallinn, Estonia, Aug. 23, 2006, XP050132059, 11 pages.

* cited by examiner

*Primary Examiner* — Seema S. Rao
*Assistant Examiner* — Henry Baron
(74) *Attorney, Agent, or Firm* — Sughrue Mion, PLLC

(57) ABSTRACT

A communication system and method for measuring communication channel qualities of one or more partial bands of a communication band is provided. A mobile station represents measured communication channel qualities of the partial bands by relative value information in a frequency direction and/or time direction and selectively communicates the relative value information to a base station. The relative value information in the frequency direction represents a difference in the communication channel qualities of the partial bands at a first timing. The relative value information in the time direction represents a difference between the communication channel qualities of the partial bands at a second timing and the communication channel qualities of the partial bands at a time prior to the second timing.

43 Claims, 25 Drawing Sheets

FIG. 10

| TIME RELATIVE VALUE INFORMATION | STEP SIZE INFORMATION |

SENDING FORMAT 1

FIG. 11

| CQI VALUE OF REFERENCE RB | FREQUENCY RELATIVE VALUE INFORMATION | STEP SIZE INFORMATION |

SENDING FORMAT 2

EXEMPLARY OPERATIONS OF CALCULATING TIME RELATIVE VALUE INFORMATION IN MOBILE STATION

FIG. 20

| FLAG | TIME RELATIVE VALUE INFORMATION | STEP SIZE INFORMATION |
|---|---|---|

SENDING FORMAT 3

FIG. 21

| FLAG | CQI VALUE OF REFERENCE RB | FREQUENCY RELATIVE VALUE INFORMATION | STEP SIZE INFORMATION |
|---|---|---|---|

SENDING FORMAT 4

FIG. 25

| CQI VALUE | CQI VALUE IN TWO BIT NOTATION | BLOCK SIZE | MODULATION METHOD | POWER OFFSET [dB] |
|---|---|---|---|---|
| 0 | — | N/A | BELOW RANGE | BELOW RANGE |
| 1 | 0 | 650 | QPSK | 0 |
| 2 | — | 1260 | QPSK | 0 |
| 3 | — | 2280 | QPSK | 0 |
| 4 | 1 | 3560 | QPSK | 0 |
| 5 | — | 4660 | QPSK | 0 |
| 6 | — | 5880 | 16QAM | 0 |
| 7 | 2 | 7160 | 16QAM | 0 |
| 8 | — | 9100 | 16QAM | 0 |
| 9 | — | 9100 | 16QAM | −3 |
| 10 | 3 | 9100 | 16QAM | −6 |

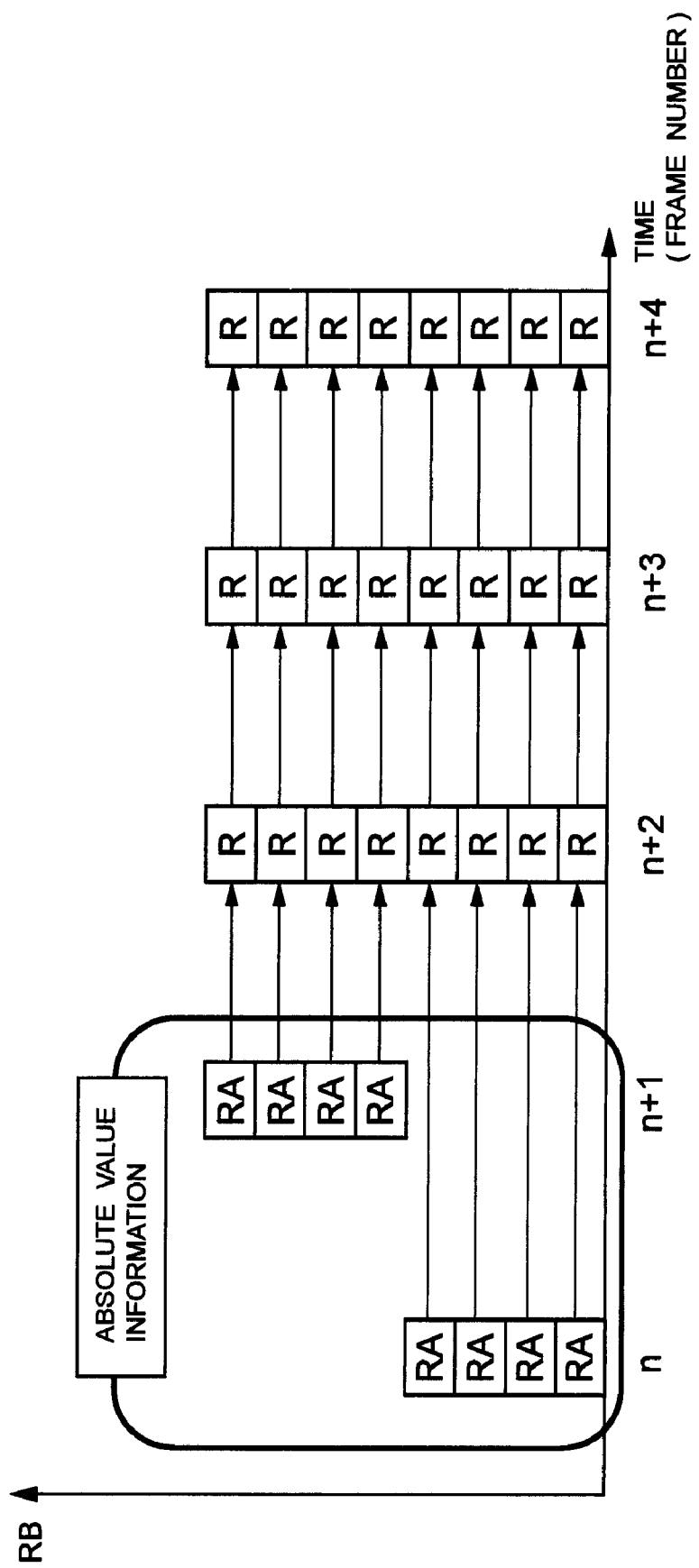

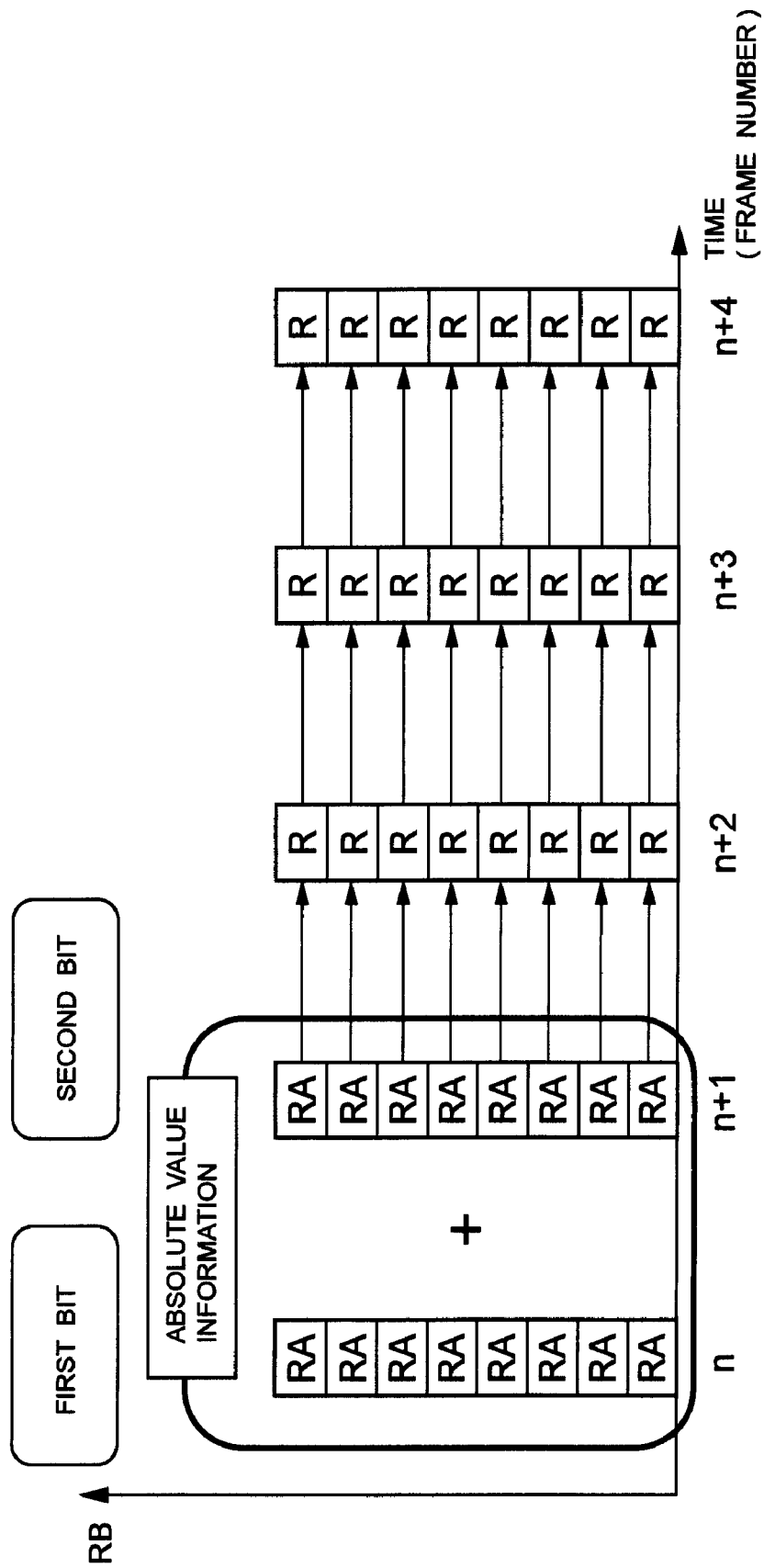

COMMUNICATION SYSTEM, COMMUNICATION METHOD, MOBILE STATION AND BASE STATION USED FOR THE SAME

This application is base upon and claims the benefit of priority from Japanese patent application No. 2006-224040, filed on Aug. 21, 2006, the disclosure of which is incorporated herein in its entirety by reference.

BACKGROUND OF THE INVENTION

1. Field of the Invention

The present invention relates to a communication system, a communication method and a mobile station and a base station used for the same, and more specifically to a communication channel quality informing method for informing a communication channel quality of a downlink channel of a plurality of different bands when a downlink packet communication is performed in a mobile communication system.

2. Description of the Related Art

A packet communication method that includes a plurality of mobile stations sharing a wireless band includes the HSDPA (High Speed Downlink Packet Access) and the LTE (Long Term Evolution) which are standardized in the 3GPP. In such a packet communication system, a mobile station measures a receiving quality of a pilot channel that is sent in a downlink channel and informs a base station of the measurement via the uplink channel as the Channel Quality Indicator (CQI).

Association between the receiving quality and the CQI is determined, for example, the CQI of 30 levels (five bits of information) is defined in the HSDPA. A base station uses the CQI informed from a mobile station for packet scheduling for allocating a sending occasion or adaptive modulation for changing a coding ratio between the modulation method and the communication channel coding. By using the communication channel quality, the base station can provide communication according to a communication channel for each mobile station for enabling an effective use of a wireless band.

As an access method of a downlink channel of the LTE, the OFDMA (Orthogonal Frequency Division Multiple Access) is considered. With the wireless band allocated to a system divided into a plurality of small Resource Blocks (RB), the mobile station informs a base station of a CQI for each RB. That implements the frequency division multiplex, enabling to allocate the resources to different mobile stations by the unit of RB (see 3GPP TSG RAN, TR25.814v.1.2.0, "Physical Layer Aspects for Evolved UTRA", (2006-2)). FIG. 1 shows an example of a wireless band allocated to a system divided into K RBs in total from 1 to K.

As a wireless band allocated to a system is getting wider, however, the transmission rate in the downlink channel is getting faster and the number of RBs are increasing. For example, under the LTE, a band for a RB is around 375 kHz, which is divided into 12 in the system band of 5 MHz. It is assumed that the band of the RB is constant regardless of the system band width. As the system band is getting wider, the mobile station needs to inform more number of CQIs.

The mobile station uses the uplink channel for informing the CQI. In the LTE, the uplink channel is also a shared channel and uses the frequency division multiplex. Therefore, the number of mobile stations that is allowed to send at the same timing is limited. Specifically, as more mobile stations are getting to connect with a base station, a periodical sending method is also used for increasing the multiplexing number in the uplink channel.

On the other hand, the CQI is used for scheduling or adaptive modulation in the downlink channel. In such a case, if a communication channel quality cannot be informed of at a suitable period, neither scheduling nor adaptive modulation adapted to the communication channel quality of the mobile station cannot be implemented. That lowers throughput in the downlink channel.

An exemplary object of the present invention is to provide a communication system with a CQI informing method that can reduce the usage rate of wireless resources required for the CQI information, a method for the same, and a mobile station and a base station used for the same.

BRIEF SUMMARY OF THE INVENTION

A communication system according to a first exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a section for representing the communication channel qualities of the partial bands, which are said measurements, by relative value information in a frequency direction and sending the communication channel qualities to said base station as said communication channel quality information at a first timing; and a section for representing the communication channel qualities of the partial bands, which are said measurements, by relative value information in a time direction for the partial band before a second timing and sending the communication channel qualities to said base station as said communication channel quality information at the second timing.

A communication system according to a second exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a section for representing the communication channel qualities of the partial bands, which are said measurements, by relative value information in a frequency direction;

a section for representing the communication channel qualities of the partial bands, which are said measurements, by relative value information in a time direction for said partial bands which are before in time; and a section for sending the information with a smaller error relative to said measurements among said relative value information in the frequency direction and said relative value information in the time direction to said base station as said communication channel quality information.

A communication system according to a third exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a section for representing the communication channel qualities of the partial bands, which are said measurements, by relative value information in a time direction for said partial bands at a timing before in time;

a section for representing the communication channel qualities of the partial bands, which are said measurements, by quantization level information which is rougher than the quantization level defined in the system; and a section for sending the information with a smaller error relative to said measurements among said relative value information in the time direction and said quantization level information to said base station as said communication channel quality information.

A communication system according to a fourth exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a section for representing the communication channel qualities of the partial bands, which are said measurements, by relative value information in a time direction for said partial bands at a timing before in time;

a section for representing the communication channel qualities of the partial bands, which are said measurements, in quantization level information which is rougher than the quantization level defined in the system; and a section for sending said quantization level information at a certain timing and said relative value information in the time direction at other timings to said base station as said communication channel quality information.

A communication method according to a first exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at the mobile station, said method comprises:

representing the communication channel qualities of the partial bands, which are said measurements by relative value information in a frequency direction, and sending the communication channel qualities to said base station as said communication channel quality information at a first timing; and representing the communication channel qualities of the partial bands, which are said measurements, by relative value information in a time direction for the partial band before a second timing and sending the communication channel qualities to said base station as said communication channel quality information at the second timing.

A communication method according to a second exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the communication channel qualities of the partial bands, which are said measurements, by relative value information in a frequency direction, representing the communication channel qualities of the partial bands, which are said measurements, by relative value information in a time direction for said partial band before in time;

sending the information with a smaller error relative to said measurements among said relative value information in a frequency direction and said relative value information in a time direction to said base station as said communication channel quality information.

A communication method according to a third exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the communication channel qualities of the partial bands, which are said measurements, by relative value information in a time direction for said partial bands at a timing before in time;

representing the communication channel qualities of the partial bands, which are said measurements, by quantization level information which is rougher than the quantization level defined in the system; and sending the information with a smaller error relative to said measurements among said relative value information in a time direction and said quantization level information to said base station as said communication channel quality information.

A communication method according to a fourth exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the communication channel qualities of the partial bands, which are said measurements, by relative value information in a time direction for said partial bands at a timing before in time;

representing the communication channel qualities of the partial bands, which are said measurements, by quantization level information which is rougher than the quantization level defined in the system; and sending said quantization level information at a certain timing and said relative value information in a time direction at other timings to said base station as said communication channel quality information.

A communication system according to a fifth exemplary aspect of the present invention is a communication system comprising a mobile station and a base station; wherein said mobile station comprises:

a measuring section for measuring communication channel qualities of one or more partial bands of a communication band in a downlink channel that is divided into a plurality of partial bands; and an information sending section for sending the measurements to a base station as communication channel quality information in an uplink channel, wherein said mobile station:

at a first timing, represents a communication channel quality of at least one partial band which is measured by said measuring section by a first code as communication channel quality information, represents a communication channel quality of at least one partial band which is different from the partial band represented by the first code which is measured by the measuring section by a second code as communication channel quality information by using a communication channel quality of any partial band represented by said first code as a reference and sends the communication channel quality information represented by said first code or said second code to the base station by said information sending section; and at a second timing, represents the communication channel quality information of partial bands represented by said first code or said second code by a third code by using communication channel quality information of a partial band represented by said first code or said second code at a timing other than the second timing as a reference and sends the communication channel quality information represented by said third code to the base station by said information sending section.

A communication system according to a sixth exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a first section for representing a communication channel quality of at least one partial band, which is said measurement, by a first code as communication channel quality information and representing a communication channel quality of at least one partial band which is different from the partial band represented by said first code which is measured by said measuring means by a second code as communication channel quality information by using a communication channel quality of any partial band represented by said first code as a reference;

a second section for representing the communication channel quality information of partial bands represented by said first code or said second code by a third code by using communication channel quality information of a partial band represented by said first code or said second code at a timing before in time as a reference; and a third section for selectively sending information obtained by said first section and said second section to the base station.

A communication system according to a seventh exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a first section for representing communication channel quality information of a partial band represented by a first code or a second code by a third code by using the communication channel quality information of a partial band represented by said first code or said second code at the timing before in time as a reference;

a second section for representing the communication channel quality of a partial band, which is said measurement, by quantization level information which is rougher than the quantization level defined in the system; and a third section for selectively sending the information obtained by said first section and said second section to the base station.

A communication system according to an eighth exemplary aspect of the present invention is a communication system for measuring communication channel qualities of one or more partial bands of a communication band in a downlink channel that is divided into a plurality of partial bands in a mobile station and sending the measurements to a base station as communication channel quality information via an uplink channel, wherein the mobile station comprises:

a first section for representing a communication channel quality of said partial band by a code based on a first format;

a second section for representing a communication channel quality of said partial band by a code based on a second format which is different from said first format; and a third section for selectively sending information represented by said first format and said second format based on errors between the measured communication channel quality and each code based on said first format and said second format to said base station.

A communication method according to a fifth exemplary aspect of the present invention is a communication method in a communication system comprising a mobile station and a base station; comprising:

measuring communication channel qualities of one or more partial bands of a communication band in a downlink channel that is divided into a plurality of partial bands, and sending the measurements to a base station as communication channel quality information via an uplink channel in a mobile station, wherein said mobile station:

at a first timing, represents a communication channel quality of at least one partial band by a first code as communication channel quality information, represents a communication channel quality of at least one partial band which is different from the partial band represented by said first code by a second code as communication channel quality information by using a communication channel quality of any partial band represented by said first code as a reference and sends the communication channel quality information represented by said first code or said second code to the base station; and at a second timing, represents the communication channel quality information of partial bands represented by said first code or said second code by a third code by using communication channel quality information of a partial band represented by said first code or said second code at a timing other than the second timing as a reference and sends the communication channel quality information represented by said third code to the base station.

A communication method according to a sixth exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, in said mobile station, said method comprises:

representing a communication channel quality of at least one partial band, which is said measurement, by a first code as communication channel quality information and representing a communication channel quality of at least one partial band which is different from the partial band represented by said first code, which is said measurement, as communication channel quality information by a second code by using a communication channel quality of any partial band represented by said first code as a reference;

representing the communication channel quality information of partial bands represented by said first code or said second code by a third code by using communication channel quality information of a partial band represented by said first code or said second code at a timing before in time as a reference; and selectively sending information represented by said second code and information represented by said third code.

A communication method according to a seventh exemplary aspect of the present invention is a communication method of a communication system for measuring communication channel qualities of one or more partial bands of a communication band in a downlink channel that is divided into a plurality of partial bands in a mobile station and sending the measurements to a base station as communication channel quality information via an uplink channel, wherein, in said mobile station, said method comprises:

representing communication channel quality information of a partial band represented by a first code or a second code by a third code by using the communication channel quality information of a partial band represented by said first code or said second code at the timing before in time as a reference;

representing the communication channel quality of a partial band, which is said measurement, by quantization level information which is rougher than the quantization level defined in the system; and selectively sending the information represented by said third code and said quantization level information.

A communication method according to an eighth exemplary aspect of the present invention is a communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, in said mobile station, said method comprises:

representing a communication channel quality of said partial band by a code based on a first format;

representing a communication channel quality of said partial band by a code based on a second format which is different from said first format; and selectively sending the information represented by said first format and said second format according to errors between the measured communication channel quality and each code based on said first format and said second format to said base station.

A mobile station according to a first exemplary aspect of the present invention is a mobile station comprising a measuring section for measuring communication channel qualities of one or more partial bands of a communication band in a downlink channel that is divided into a plurality of partial bands in a mobile communication system and an information sending section for sending the measurements to a base station as communication channel quality information via an uplink channel, wherein said mobile station:

at a first timing, represents a communication channel quality of at least one partial band which is measured by said measuring section by a first code as communication channel quality information, represents a communication channel quality of at least one partial band, which is different from the partial band represented by said first code and is measured by said measuring section, by a second code as communication channel quality information by using a communication channel quality of any partial band represented by said first code as a reference, and sends the communication channel quality information represented by said first code or said second code to the base station by said information sending section; and at a second timing, represents the communication channel quality information of partial bands represented by said first code or said second code by a third code by using communication channel quality information of a partial band represented by said first code or said second code at a timing other than the timing as a reference and sends the communication channel quality information represented by said third code to the base station by said information sending section.

A mobile station according to a second exemplary aspect of the present invention is a mobile station for measuring communication channel qualities of one or more partial bands of a communication band in a downlink channel that is divided into a plurality of partial bands in a mobile communication system and sending the measurements to a base station as communication channel quality information via an uplink channel, comprising:

a first section for representing a communication channel quality of at least one partial band, which is said measurement, by a first code as communication channel quality information and representing a communication channel quality of at least one partial band which is different from the partial band represented by said first code as communication channel quality information by a second code by using a communication channel quality of any partial band represented by said first code as a reference;

a second section for representing the communication channel quality information of partial bands represented by said first code or said second code by a third code by using communication channel quality information of a partial band represented by said first code or said second code at a timing before in time as a reference; and a third section for selectively sending information obtained by said first section and said second section to the base station.

A mobile station according to a third exemplary aspect of the present invention is a mobile station for measuring communication channel qualities of one or more partial bands of a communication band in a downlink channel that is divided into a plurality of partial bands in a communication system and sending the measurements to a base station as communication channel quality information via an uplink channel, comprising:

a first section for representing communication channel quality information of a partial band represented by a first code or a second code by a third code by using the communication channel quality information of a partial band represented by said first code or said second code at the timing before in time as a reference;

a second section for representing the communication channel quality of a partial band, which is said measurement, by quantization level information which is rougher than the quantization level defined in the system; and a third section for selectively sending the information obtained by said first section and said second section to the base station.

A mobile station according to a fourth exemplary aspect of the present invention is a mobile station for measuring communication channel qualities of one or more partial bands of a communication band in a downlink channel that is divided into a plurality of partial bands in a mobile communication system and sending the measurements to a base station as communication channel quality information via an uplink channel, comprising:

a first section for representing a communication channel quality of said partial band by a code based on a first format;

a second section for representing a communication channel quality of said partial band by a code based on a second format which is different from said first format; and a third section for selectively sending information represented by said first format and said second format according to errors between the measured communication channel quality and each code based on said first format to said base station.

A recording medium according to a first exemplary aspect of the present invention is a recording medium recording a program for causing a computer to execute operations of a mobile station comprising: a measuring process of measuring communication channel qualities of one or more partial bands of a communication band in a downlink channel that is divided into a plurality of partial bands in a mobile communication system; and an information sending process of sending the measurements to a base station as communication channel quality information via an uplink channel, wherein the program:

at a first timing, represents a communication channel quality of at least one partial band which is measured by said measuring process by a first code as communication channel quality information, represents a communication channel quality of at least one partial band which is different from the partial band represented by said first code which is measured by said measuring means by a second code as communication channel quality information by using a communication channel quality of any partial band represented by said first code as a reference and sends the communication channel quality information represented by said first code or said second code to the base station by said information sending process; and at a second timing, represents the communication channel quality information of partial bands represented by said first code or said second code by a third code by using communication channel quality information of a partial band represented by said first code or said second code at a timing other than the timing as a reference and sends the communication channel quality information represented by said third code to the base station by said information sending process.

A recording medium according to a second exemplary aspect of the present invention is a recording medium recording a program for causing a computer to execute operations of a mobile station of: measuring communication channel qualities of one or more partial bands of a mobile communication band in a downlink channel that is divided into a plurality of partial bands in a mobile communication system and sending the measurements to a base station as communication channel quality information via an uplink channel, comprising:

a first process of representing a communication channel quality of at least one partial band which is said measurement by a first code as communication channel quality information and representing a communication channel quality of at least one partial band which is different from the partial band represented by said first code which is measured by said measuring means by a second code as communication channel quality information by using a communication channel quality of any partial band represented by said first code as a reference;

a second process of representing communication channel quality information of partial bands represented by said first code or said second code by a third code by using communication channel quality information of a partial band represented by said first code or said second code at a timing before in time as a reference; and a process of alternatively sending the information represented by said first process or said second process to the base station.

A recording medium according to a third exemplary aspect of the present invention is a recording medium recording a program for causing a computer to execute operations of a mobile station of: measuring communication channel qualities of one or more partial bands of a communication band in a downlink channel that is divided into a plurality of partial bands in a communication system and sending the measurements to a base station as communication channel quality information via an uplink channel, comprising:

a first process of representing communication channel quality information of a partial band represented by a first code or a second code by a third code by using the communication channel quality information of a partial band represented by said first code or said second code at the timing before in time as a reference, a second process of representing the communication channel quality of a partial band, which is said measurement, by quantization level information which is rougher than the quantization level defined in the system; and a third process of alternatively sending the information represented by said first process and said second process to the base station.

BRIEF DESCRIPTION OF THE DRAWINGS

FIG. 10 shows an exemplary format by which the mobile station informs the base station on the time relative value in the first exemplary embodiment of the present invention;

FIG. 11 shows an exemplary format by which the mobile station informs the base station on the frequency relative value in the first exemplary embodiment of the present invention;

FIG. 20 shows an exemplary format by which the mobile station informs the base station on the time relative value in the second exemplary embodiment of the present invention;

FIG. 21 shows an exemplary format by which the mobile station informs the base station on the frequency relative value in the second exemplary embodiment of the present invention;

FIG. 25 is a diagram showing an example of a quantizing table in the mobile station and the base station in the third exemplary embodiment of the present invention;

FIG. 26 is a diagram for illustrating a method for informing the CQI value in the fourth exemplary embodiment; and FIG. 27 is a diagram for illustrating a method for informing the CQI value in the modification of the fourth exemplary embodiment.

DETAILED DESCRIPTION OF THE EXEMPLARY EMBODIMENTS

The present invention will be detailed below with reference to the drawings. As mentioned above, according to the methods for informing CQI information of each RB by an absolute value, the usage rate of the wireless resources required for informing the CQI increases. Therefore, in order to solve the problem, a method for saving the wireless resources by informing relative value information instead of that for informing the CQI information of each RB by an absolute value can be considered. The relative value information can also be represented as difference information or differential information.

Figure 1:
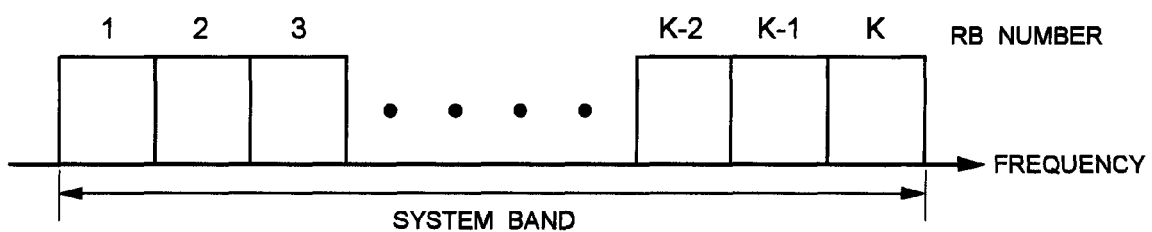
FIG. 1 is a diagram showing relationship between the system band and RB.
Figure 2:
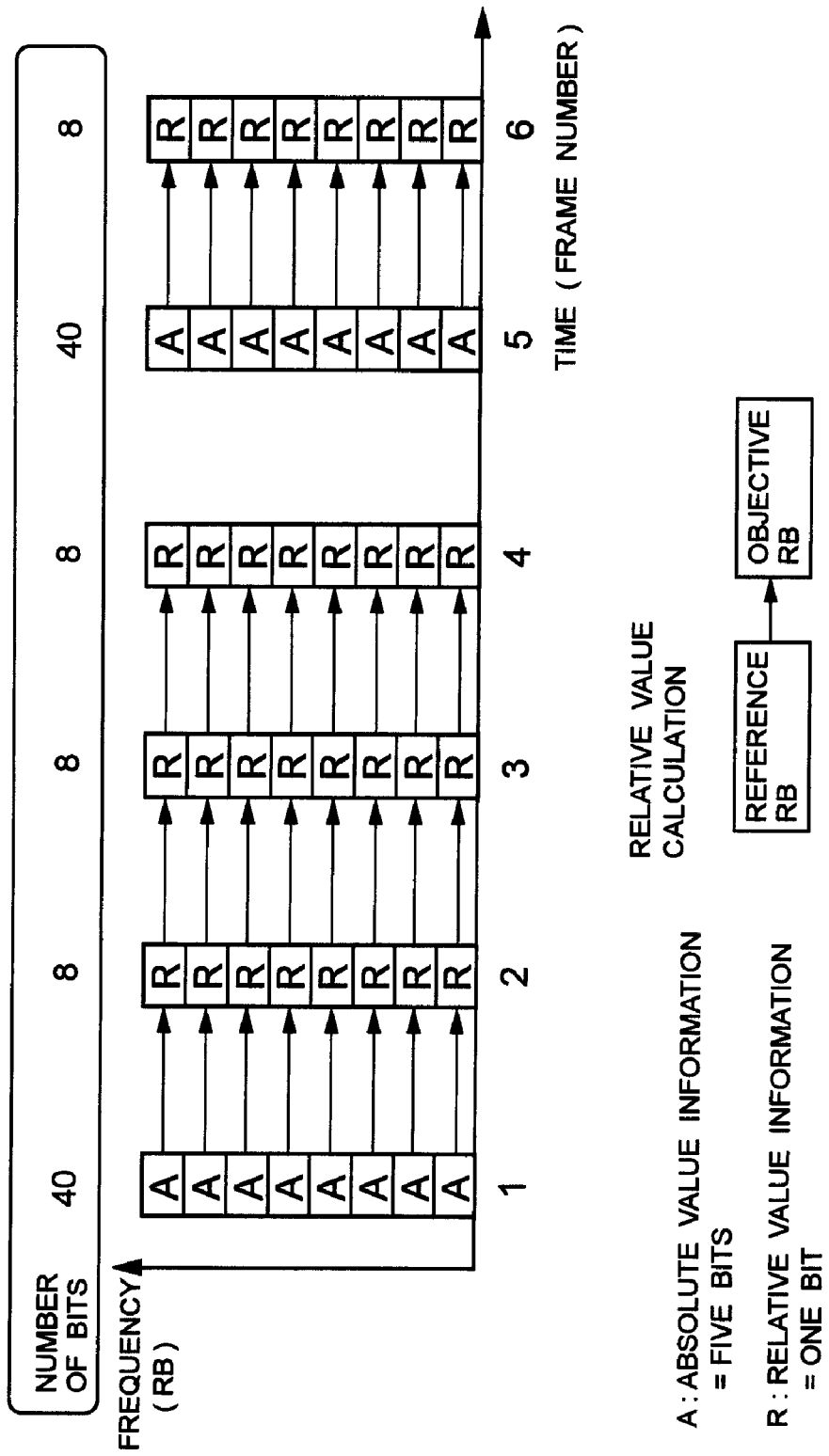
FIG. 2 is a diagram for illustrating an example of a method for informing the CQI value of each RB.

Specifically, as an informing method using such relative value information, a method as shown in FIG. 2 can be considered. In the informing method shown in FIG. 2, the absolute value information or the relative value information of the CQI of each RB is informed by an unit sending time (here, it is called a frame) in a wireless layer, with the absolute value information being informed for the CQI in a part of the frames and the relative value information being informed for the CQI in the other frames. Here, the relative value information is generated based on whether the CQI value in the objective RB is bigger or smaller than a reference which is the CQI value of the same RB as the objective RB, which is obtained in the frame immediately before the frame to which the object RB belongs.

As a unit time for sending a data block from the upper layer, TTI (Transmission Time Interval) is known. Hereinafter, 1TTI is described as a frame, however, the present invention is not limited to that and 1TTI may be set bigger than a frame. A unit sending time in a wireless layer may be called a "frame", or a block of a predetermined number of sub-frames may be called a "frame". That depends on the system. In this specification, a unit time sending time is called a "frame".

For example, referring to FIG. 2, absolute value information A of the CQI of each RB is informed of at the timing of the first frame and the timing of the fifth frame, and relative value information R in the time axis direction (hereinafter called as time relative value information or a time relative value as an abbreviation) that is calculated by using the CQI value in a frame immediately before the frame to which each RB belongs, as a reference, is informed of at other timings. According to this manner, if the number of RBs is eight, the absolute value information A of the CQI in each RB is five bits and the relative value information R is one bit (information of either "1" or "0" for indicating whether one step size increases or decreases), 40 bits of information is required at the timing of the first frame and at the timing of the fifth frame, and eight bits of little information are sufficient at the timing of the other frames.

Figure 3:
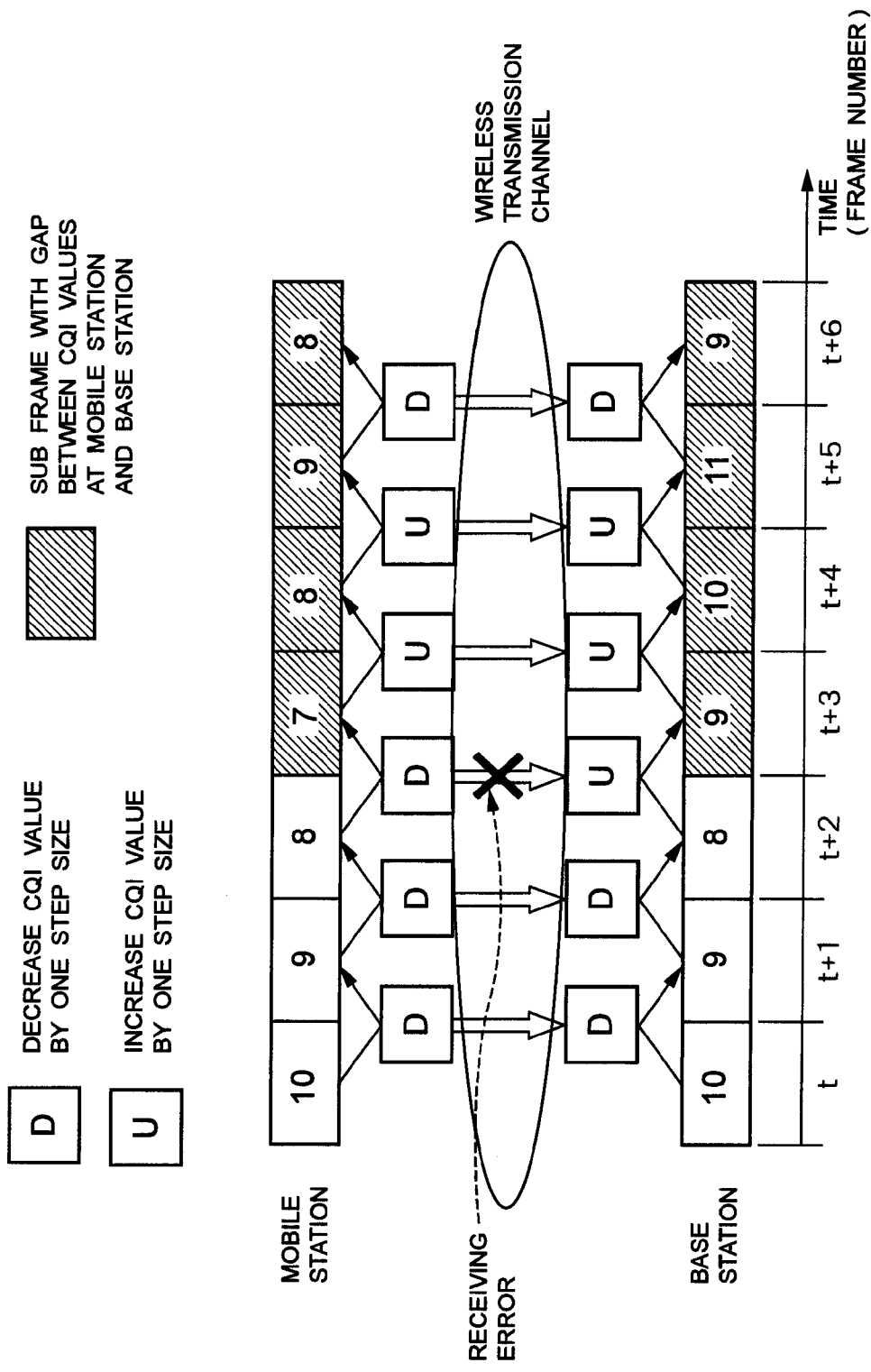
FIG. 3 is a diagram for illustrating a problem in the informing method in FIG. 2.

As shown in FIG. 2, the absolute value information A is preferably informed of at a predetermined cycle. The reason for that is: First, absolute value information is required for indicating a reference value of a relative value at starting when it starts to inform the CQI. Second, if a receiving error in the relative value information occurs in a base station, there is a gap between the CQI values that are respectively updated in a mobile station and the base station, and the gap between the mobile station and the base station propagates. The gap between the CQI values at the mobile station and the base station will be described with reference to the example shown in FIG. 3. FIG. 3 shows CQI values at a mobile station and a base station at the times (frames) from t+1 to t+6 and time relative value information at the mobile station and the base station at the times from t+2 to t+6. Here, "D" indicates the time relative value information for decreasing the CQI value by one step size and "U" indicates the time relative value information for increasing the CQI value by one step size. The CQI value at the time t+1 is 10 with the step size of one. In FIG. 3, a receiving error of the time relative value information of the CQI value at the time t+3, which is calculated by using the CQI value at the time t+2 as a reference, occurred. It causes a gap between the CQI value at the time t+3 in the base station and the CQI value at the time t+3 in the mobile station, which propagates to the CQI values of the frames after the time t+4. In FIG. 3, each frame with a gap in CQI values between the mobile station and the base station is shown with slanted lines. Periodically informing the absolute value information is effective in resetting such propagation of a gap.

In such a method, however, in a frame in which the absolute value information is informed of, the number of bits of information to be sent is much more than the frame in which the relative value information is informed of. That leads a problem in that the wireless resources in the uplink channel are consumed. When fluctuation in time of CQI values is big, the relative value information cannot follow the big fluctuation in time of CQI values, which widens an error between the CQI value measured by the mobile station and the CQI value informed to the base station. That may lead problems in that neither correct scheduling nor adaptive modulation can be performed.

Therefore, the present invention reduces a usage rate of the wireless resources in the uplink channel by further reducing the number of sending bits of the CQI value. Exemplary embodiments of the present invention will be detailed below.

Figure 4:
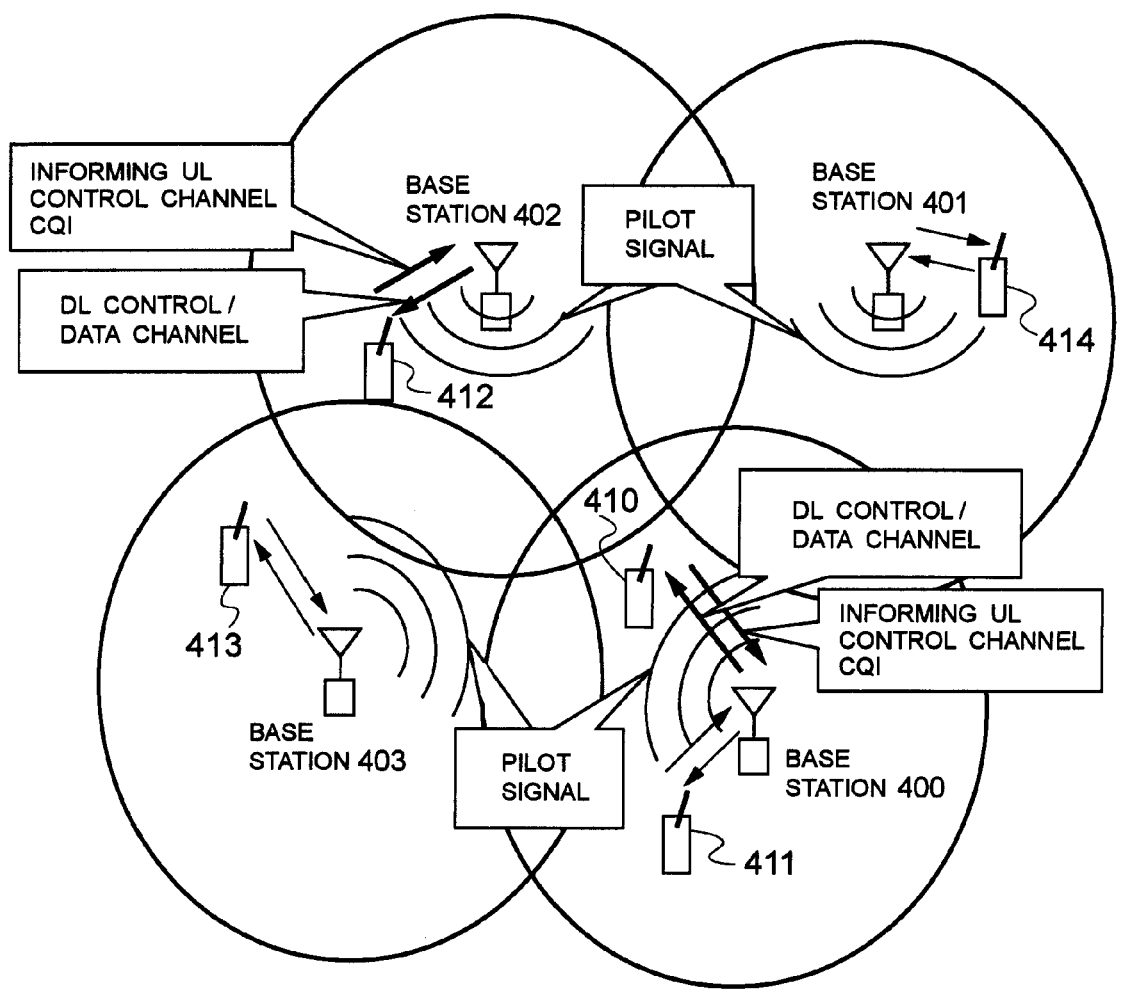
FIG. 4 is a system configuration diagram to which the exemplary embodiment of the present invention is applied.
Figure 5:
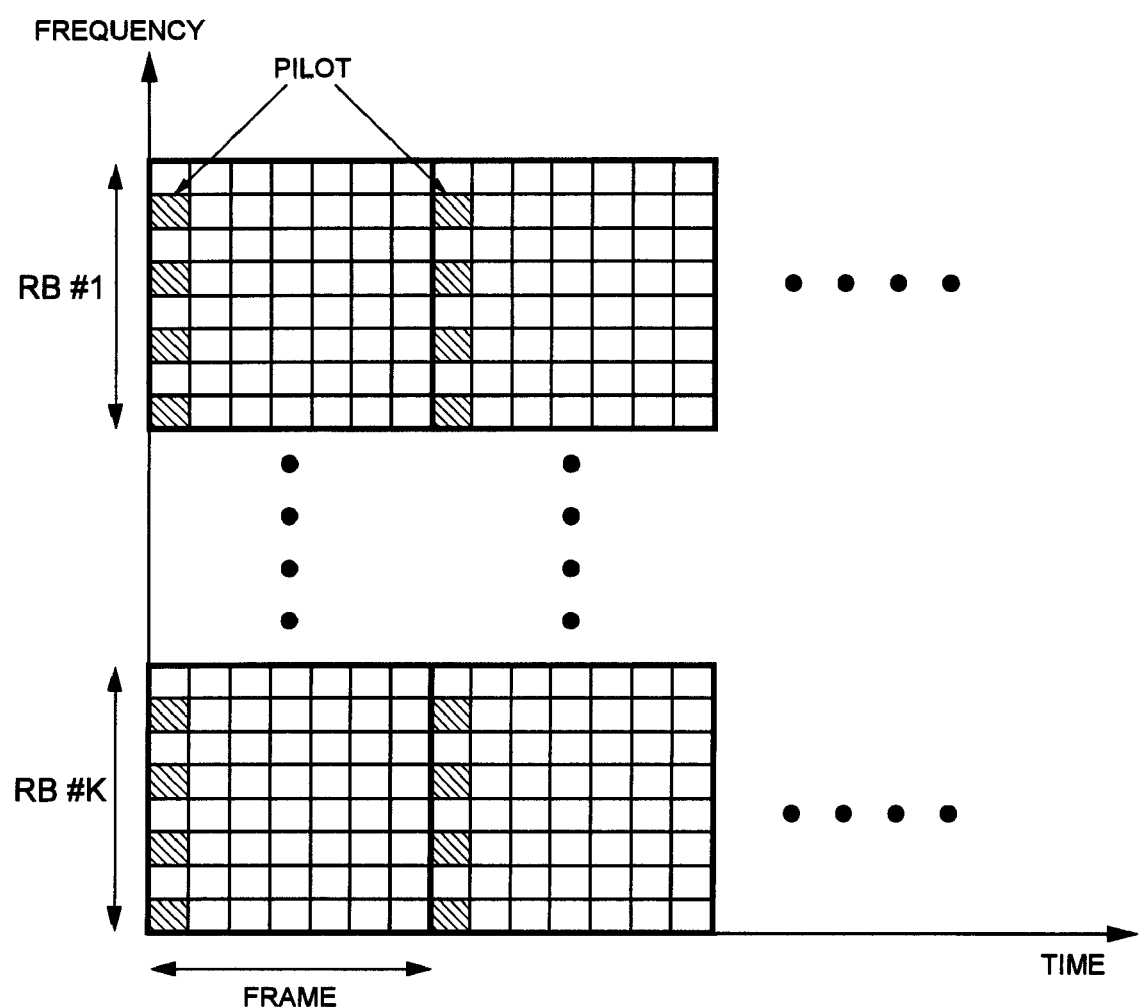
FIG. 5 is a diagram showing relationship between the time and the frequency of RB.

FIG. 4 is a diagram showing a configuration of a system common to all the embodiments of the present invention. The system includes a plurality of base stations 400 to 403 and a plurality of mobile stations 410 to 414 connecting to each of the plurality of base stations. Each of the plurality of base stations multiplexes a pilot signal on a carrier of a predetermined frequency, multiplies the result by a scrambling code unique to the base station and sends the multiplying result for each frame. Here, it is assumed that a block of a predetermined number of frequency carriers is called as an RB (Resource Block) and at least a pilot signal is multiplexed on 1RB as shown in FIG. 5. It is also assumed that a partial band corresponding to one CQI value consists of one or more RBs. In the description below, it is assumed that a partial band is 1RB.

The mobile station performs the packet transmission in the downlink channel by sending and receiving a control channel in the uplink (UL)/the downlink (DL) channel and a data channel in the downlink channel with the base station (BS), which is being connected. Each mobile station sends a signal (hereinafter referred to as a CQI) indicating a channel quality of each RB based on the receiving quality of a pilot signal in the RB that is sent by the BS in the uplink control channel. For the receiving quality, an interference power against a receiving power of the pilot signal (SIR) or a receiving power level of the pilot signal may be used. In the description below, it is assumed that the CQI value is in an appropriate sending form (such as a modulation method or a block size) decided based on the receiving SIR of the pilot signal. To decide the CQI value based on the receiving quality is also expressed as measuring the CQI.

The CQI value as a sending form can be obtained in the manner below, for example. First, the mobile station estimates a communication channel quality from a receiving power of a pilot signal. If the base station performs a transmission at a provisional sending power with the estimated communication channel quality, the CQI measuring section obtains a sending form for each RB such that a transport block error rate of a frame does not exceed a predetermined value as a CQI value.

Then, the provisional sending power can be calculated by a calculating method for adjusting the provisional sending power with a certain pilot signal as a reference such as:

making the provisional sending power as the same as the power of a pilot signal included in an RB;

obtaining the provisional sending power by adding/subtracting the power of the pilot signal included in the RB to/from a predetermined offset;

obtaining the provisional sending power by further adding/subtracting a predetermined reference adjustment offset to/from the added/subtracted result of the power of the pilot signal included in the RB to/from the predetermined offset.

The provisional sending power may be calculated by multiplying the power of the pilot signal by a predetermined factor instead of adding/subtracting the values as mentioned above. Here, the predetermined offset or the predetermined reference adjustment offset may be given from outside via a network or obtained by referencing a table in the mobile station.

Then, the base station schedules allocation of the wireless resources (RB and the like) for the mobile station based on the informed CQI signal or the like. For example, a scheduler may perform scheduling such that each RB that is used for sending data is preferentially allocated to a mobile station whose RB has the best channel quality among mobile stations that are waiting for data to be sent. The base station sends the number of RBs to be allocated to each mobile station, a data size, a signal relating to data sending form required for receiving process such as a modulation method in a control signal in the downlink channel over a control channel. Thereafter, the base station sends data over the data channel by using a data sending form specified after a predetermined time.

Here, a scheduling method by the mobile station in the embodiment of the present invention is not limited to those described above. For example, a scheduler, so-called a proportional fairness, that improves fairness among mobile stations by preferentially selecting a mobile station with the best instantaneous receiving quality against the average receiving quality in each RB, may be used.

First Exemplary Embodiment

In the first exemplary embodiment, CQI signals based on the absolute value information of the CQI value of a reference RB and the relative value information in a frequency direction of the other RBs are informed (hereinafter referred to frequency relative value information or a frequency relative value as an abbreviation) by basically informing a CQI signal based on time relative value information in a predetermined cycle. As described with reference to FIG. 3, when a receiving error occurs in a certain frame at the base station in the case where a CQI signal based on time relative value information is used, a gap between the CQI values at the mobile station and the base station propagates in the frames thereafter. Then, in the embodiment, the absolute value information of the CQI value in the reference RB and the frequency relative value information of the other RBs are informed of to reset such a gap in a predetermined cycle.

Figure 6:
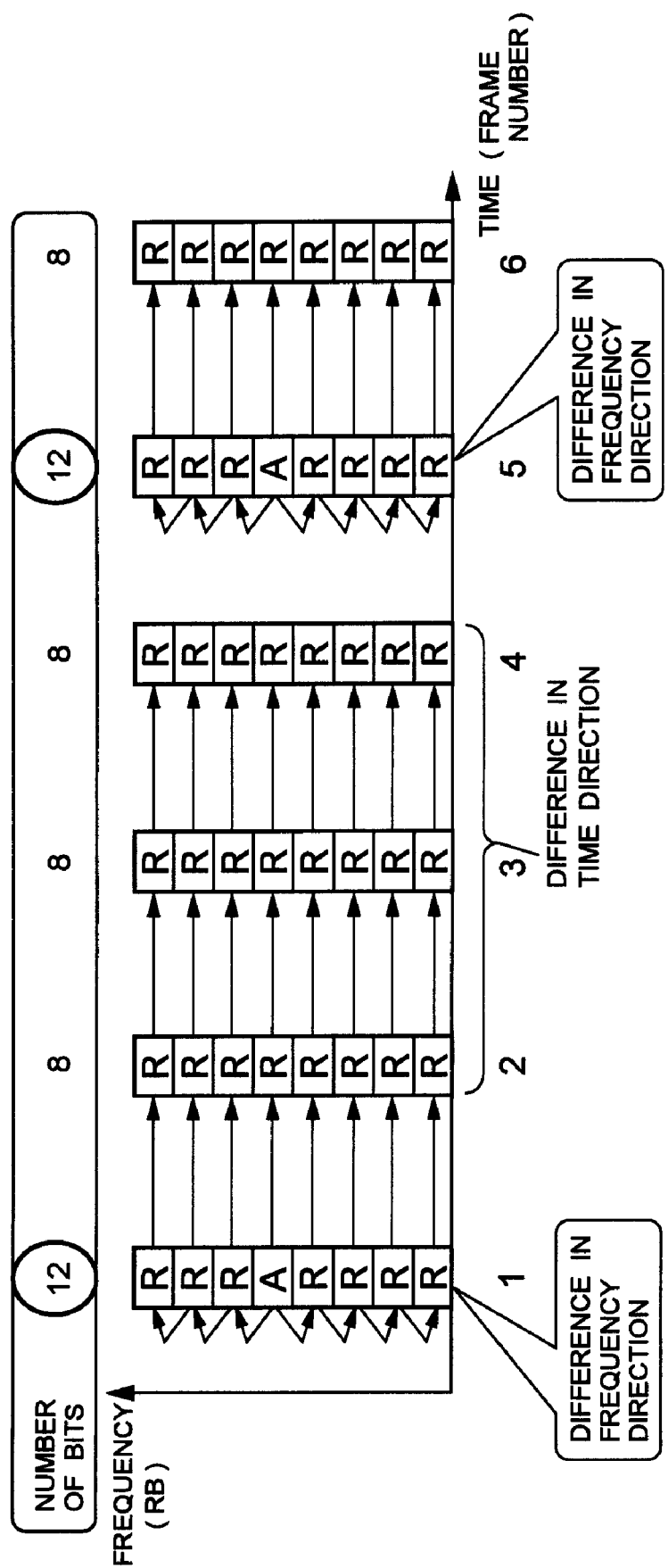
FIG. 6 is a diagram for illustrating a method for informing the CQI value in the first exemplary embodiment of the present invention.

FIG. 6 is a diagram showing an operational principle of the embodiment of the present invention. As in FIG. 2, A indicates the absolute value information and R indicates the relative value information. The relative value information R is divided into the time relative value information in the time axis direction and the frequency relative value information in the frequency axis direction. In FIG. 6, the CQI value of the reference RB is expressed as the absolute value information A at the timing of the first frame and at the timing of the fifth frame that are for resetting a gap between the CQI values at the mobile station and the base station. Also in FIG. 6, the frequency relative value R is made by using a difference between the CQI values in the direction of higher or lower frequency in order with the reference RB being a reference. Hereinafter, representation of the CQI value by the absolute value information at the reference RB and the relative value information in the frequency axis direction at the other RB at the timing of the first frame and at the timing of the fifth frame is called the frequency relative value notation. At the timings of the other frames, the time relative value R is made by using a difference between the CQI values in the same RB at times before and after (different times). Hereinafter, representation of the CQI value by the time relative value at the timings of the frames is called as the time relative value notation.

For example, also in the embodiment, if the absolute value information A is five bits and the relative value information R is one bit, the amount of information on the CQI value at the timing of the first frame and the timing of the fifth frame that are for resetting a gap between the CQI values is 12 bits as shown in the figure. That is further less than in the case shown in FIG. 2.

Figure 7:
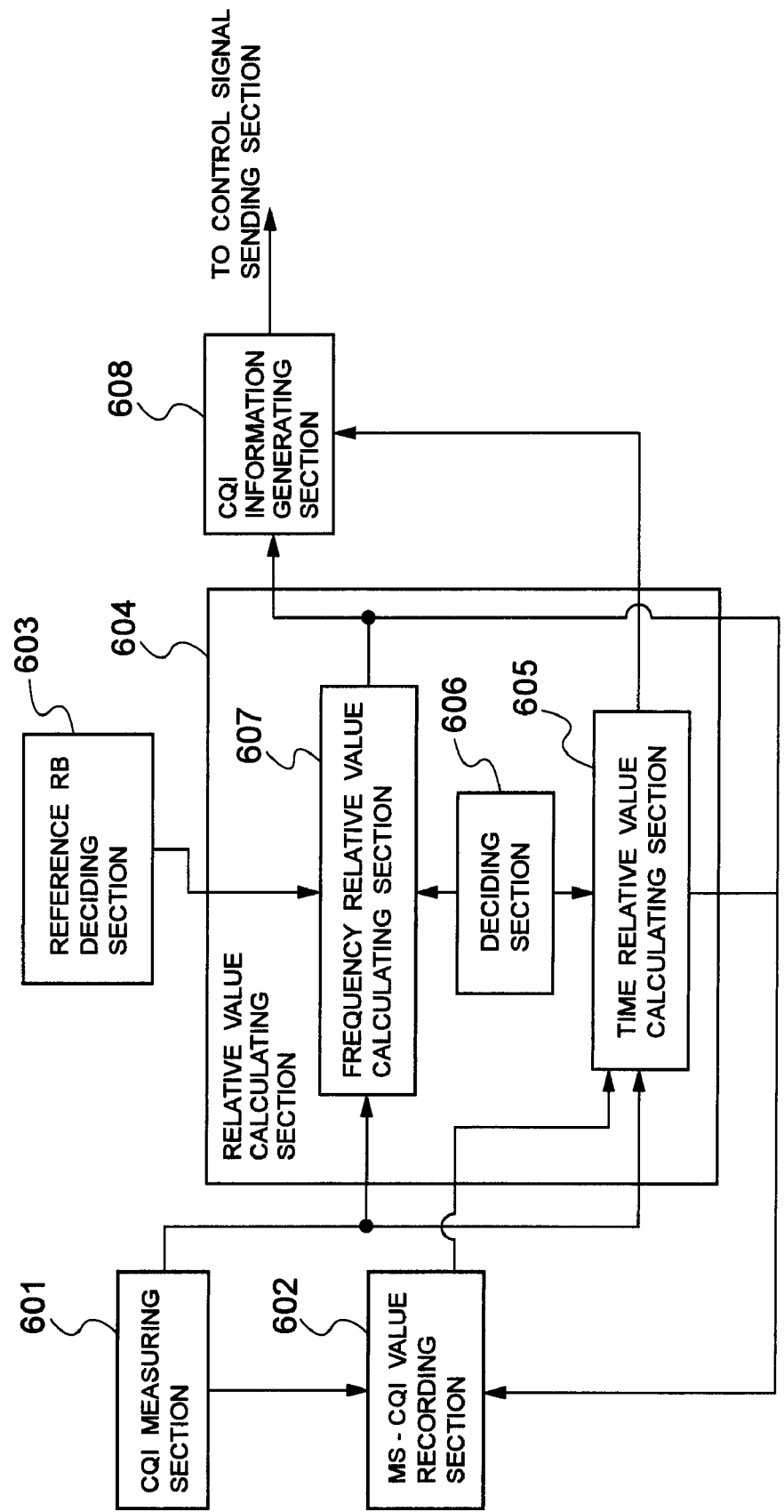
FIG. 7 is a block diagram of the mobile station in the first exemplary embodiment of the present invention.
Figure 8:
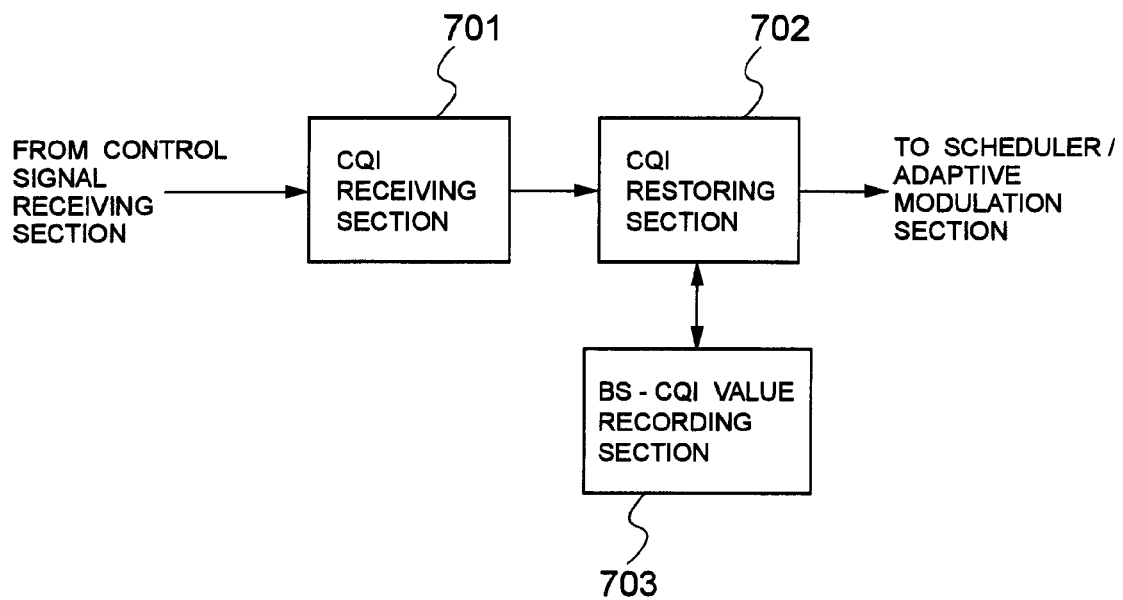
FIG. 8 is a block diagram of the base station in the first exemplary embodiment of the present invention.

Configurations of the mobile station and the base station of the first exemplary embodiment are shown in FIG. 7 and FIG. 8, respectively. As shown in FIG. 7, the mobile station includes a CQI measuring section 601 for measuring a CQI value of each RB, an MS (Mobile Station)-CQI value recording section 602 for recording the measured CQI value and a previous CQI value for calculating the time relative value information R, a reference RB deciding section 603 for deciding a reference RB (the RB corresponding to the absolute value information A in FIG. 6) required for calculating the frequency relative value R, a relative value calculating section 604 for calculating the time relative value information and the frequency relative value information, and a CQI information generating section 608 for generating CQI information that is sent to the base station by using the calculation information calculated by the relative value calculating section 604. It is assumed that each section in FIG. 7 is operating in frame synchronization with each other in frames by control means (not shown).

The relative value calculating section 604 includes a time relative value calculating section 605 for calculating the time relative value information, a frequency relative value calculating section 607 for calculating the frequency relative value information, and a deciding section 606 for deciding which of the time relative value calculating section 605 and the frequency relative value calculating section 607 is to calculate the relative value information. The frequency relative value calculating section 607 calculates the frequency relative value information by using the reference RB decided by the reference RB deciding section 603 and the measurement by the CQI measuring section 601, sends the result to the CQI information generating section 608 and further records a restored value obtained in the calculating process to the MS-CQI value recording section 602. The time relative value calculating section 605 calculates the time relative value information by using the current measurement by the CQI measuring section 601 and a previous restored value recorded in the MS-CQI value recording section 602 (to be detailed later), sends the result to the CQI information generating section 608 and further records a restored value obtained in the calculating process to the MS-CQI value recording section 602. The CQI information generating section 608 changes the relative value information received from the time relative value calculating section 605 or the frequency relative value calculating section 607 into a format to be described later and sends it to a control signal sending section (not shown).

As shown in FIG. 8, the base station includes a CQI receiving section 701 for receiving the CQI information obtained by a control signal receiving section (not shown) that is for receiving a control signal from a mobile station, a CQI restoring section 702 for restoring a CQI value of each RB based on the received information and sending out it to the scheduler/adaptive modulation section (not shown), and a BS (Base Station)-CQI value recording section 703 that records a restored value required for restoring a CQI value of the time relative value information (to be described later) to be read out in future. As the other functions are the same as those of conventional mobile station and base station, they are omitted from the description.

Figure 9:
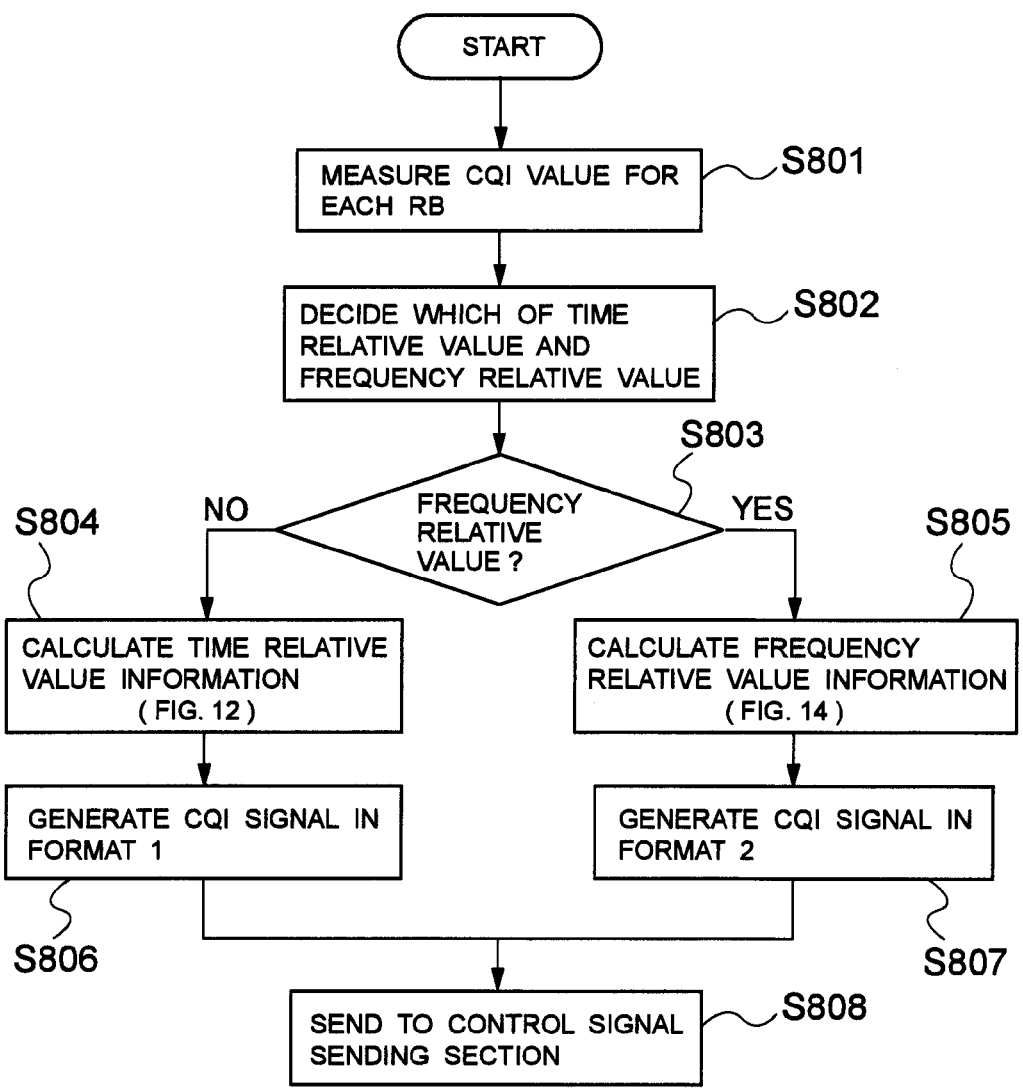
FIG. 9 is a flowchart showing operations of the mobile station in the first exemplary embodiment of the present invention.

First, operations of a mobile station will be described with reference to the flowchart of FIG. 9. The mobile station obtains a CQI by measuring a receiving quality of a pilot signal at the CQI measuring section 601 and obtains the CQI value for each RB (step S801).

The deciding section 606 included in the relative value calculating section 604 decides which of the time relative value notation and the frequency relative value notation is to be used for each frame (step S802). In the embodiment, the frequency relative value notation is used for each of a predetermined number of N frames and the time relative value notation is used for the other frames as the deciding method, for example. That is, in the frame of the frame number j, if mod (j, N)=0, the frequency relative value notation is decided to be used (YES at step S803), and if mod (j, N)>0, the time relative value notation is decided to be used (NO at step S803).

The scope of the present invention is not limited to that, however, and the frequency relative value notation is used with appropriate time intervals according to a predetermined rule and the time relative value notation is used in the other frames. It is assumed that the predetermined number N and the predetermined rule are previously known such as by being given to the base station via a network.

If the deciding section 606 decided to use the time relative value notation in a frame by the abovementioned method, the time relative value information of the each of RB is calculated in the time relative value calculating section 605, the calculated result is sent to the CQI information generating section 608 and the restored value is further recorded in the MS-CQI value recording section 602 (step S804). If it is decided to use the frequency relative value notation in a frame, the frequency relative value information other than the reference RB is calculated in the frequency relative value calculating section 607, the calculated result is sent to the CQI information generating section 608 with the CQI value of the reference RB and the restored value is further recorded in the MS-CQI value recording section 602 (step S805). The CQI information generating section 608 generates the CQI signal by using the format 1 shown in FIG. 10 in the case of the time relative value information or the format 2 shown in FIG. 11 in the case of the frequency relative value information (steps S806/807), and sends it to a control signal sending section (not shown) (step S808).

The format 1 in FIG. 10 consists of the time relative value information (R in the RB in each of the frames 2, 3, 4 and 6 in FIG. 6) and step size information. The format 2 in FIG. 11 consists of the CQI value of the reference RB (A of the frames 1 and 5 in FIG. 6), the frequency relative value information (R in the RB in either the frame 1 or 5 in FIG. 6) and step size information for increasing or decreasing the CQI value. Specific examples of each type of the information will be described later. Here, the time relative value information and the frequency relative value information are recorded in the ascending order of the RB number k. The frequency relative value information does not include the relative value information of the reference RB.

A corresponding table of a plurality of step sizes and numbers is prepared in each of the mobile station and the base station, and the mobile station may inform the base station of the number of the selected step size as the step size information. The format shown here is merely an example, and the information may be sent in a different signal format.

A calculating method of the time relative value information R at step S804 and a generating method of the CQI information using the information will be detailed below with reference to FIG. 12. The time relative value calculating section 605 in FIG. 7 performs the operations below. First, it sets the RB number k as k=1 (step S901). It compares the CQI value of the RB with the CQI value, which is a previous restored value recorded in the MS-CQI value recording section 602 (step S902). If the CQI(k; t) represents the CQI value at the time (frame) t of the RB number k, the time relative value RelativeCQI(k) (k is an integer representing 1 to K and K is the total number of RBs) is calculated by the formula below (step S903 or 904). In such a case where the CQI value (CQI(k; t−1)), which is the previous restored value, is not recorded, it can use a previously defined default value.

If CQI(k; t)>CQI(k; t−1):
$$\text{RelativeCQI}(k) = 1 \quad \ldots \ldots \quad (1)$$

-continued

If CQI(k; t)≦CQI(k; t−1):
    RelativeCQI(k)=0 ...... (2).

Here, inequality signs in formulae (1) and (2) may be ≧ in the formula (1) and < in the formula (2) (that will be the same in the description below).

For the calculation in the next RB, it adds the RB number k (step S905). If k is more than K, which is the total number of RBs (NO at step S906), it returns to step S902 and repeats the steps until calculation is done for all the RBs (steps S902 to S906).

Next, it calculates the restored value ReCQI(k; i) by using the compared result and the step size S and decides the step size. First, it sets the variable i for selecting the step size S to one (step S907) and makes the first step size S as ai (step S908). Then, it sets the RB number k as k=1 (step S909) and performs the calculations below.

If RelativeCQI(k)=1:
    ReCQI(k; i)=CQI(k; t−1)+S
If RelativeCQI(k)=0:
    ReCQI(k; i)=CQI(k; t−1)−S.

For the calculation in the next RB, it adds the RB number k (step S913), and repeats the steps until calculation is done for all the RBs (steps S910 to S914).

Here, I is an integer, but I may be an integer of two or more and a plurality of step sizes S may be prepared. In such a case, it calculates a restored value for each step size by adding the step size number i (step S915) and performing the steps S908 to S916. Then it selects the step size with the least error with the CQI value, which is determined as the restored value ReCQI(k; i) for each of the calculated step size (step S917). As a method for selecting the step size, a method for calculating an optimal value in a least square approximation and selecting the step size closest to the value is known. For a method for calculating an error, the sum of absolute values of errors among all the RBs may be used. Alternatively, the error of the RB with the biggest measured CQI may be used. Or, the sum of errors of the RBs of the upper level M (M is an integer of one or more) may be used. Then, it records the restored value ReCQI(k;i0) that is calculated with the step size (i=i0) with the least error as the CQI(k;t) (k=1, . . . , K) in the MS-CQI value recording section 602 (step S918). Then it informs the CQI information generating section 608 of the time relative value information RelativeCQI(k, i0) (k=1, . . . , K) and the selected step size ai0. The CQI information generating section 608 generates the sending format 1 shown in FIG. 10 based on the informed information.

Although the compared result is indicated by two levels of big or small as represented by one bit notation in the embodiment, it may be indicated by four levels as represented by two bit notation. For example, it may calculate an error Err between the CQI value at the time t and the CQI value at the time (t−1) added with different step sizes of four levels in the manner to be described below, where the step size is S, and send the two bit notation indicating the step size with the least error.

Err(k;"11")=|CQI(k, t)−CQI(k;t−1)+3×S|
Err(k;"01")=|CQI(k, t)−CQI(k;t−1)+ S|

Err(k;"00")=|CQI(k, t)−CQI(k;t−1)−S|
Err(k;"10")=|CQI(k, t)−CQI(k;t−1)−3×S|

If Err(k;"01") is the least among the four values above, "01" is sent as the CQI information and the restored value is calculated by CQI(k;t)=CQI(k;t−1)−3×S.

Figure 12:
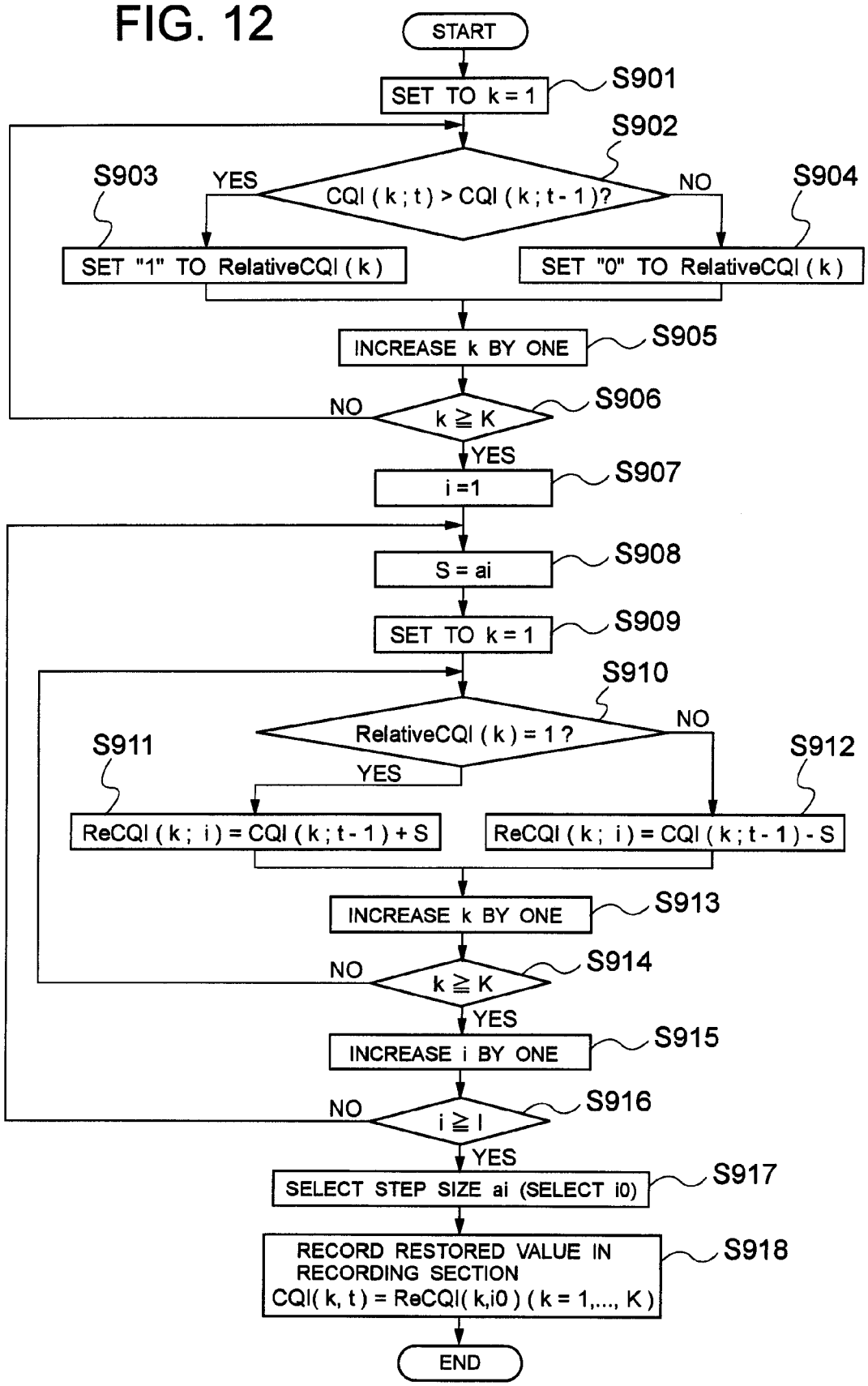
FIG. 12 is a flowchart showing details of step S804 in FIG. 9.
Figure 13:
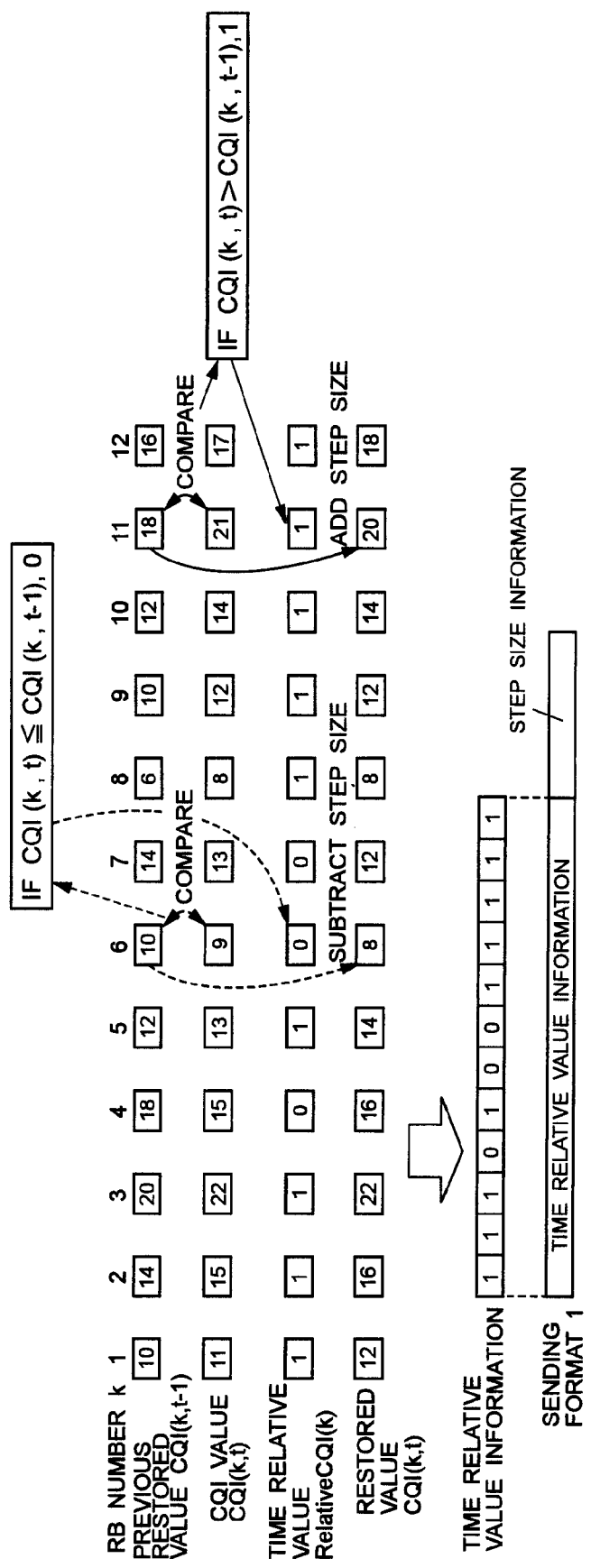
FIG. 13 is a diagram showing an example of a calculating operation of the time relative value information by the mobile station.

FIG. 13 shows calculating operations in the mobile station described above at steps S903 and S904 and at steps S912 and S913 shown in FIG. 12. Here, it shows a case where the step size S is two. For each RB, the time relative value information is calculated as one if the CQI value at the time t is bigger than the previous restored value (recorded value) in FIG. 13, and it is calculated as zero, if the value is smaller (step S903 or S904). A restored value of each RB is calculated by adding the step size to the previous restored value if the relative value information is one, and by subtracting the step size from the previous restored value, if the relative value information is zero (steps S912 and S913). For the step size, the step size with an error of the restored value is the closest to the present measured value is selected as mentioned above. The relative value information and the step size information obtained in the manner are generated as the abovementioned format 1. The present embodiment merely shows an example and various modifications can be made.

Figure 14:
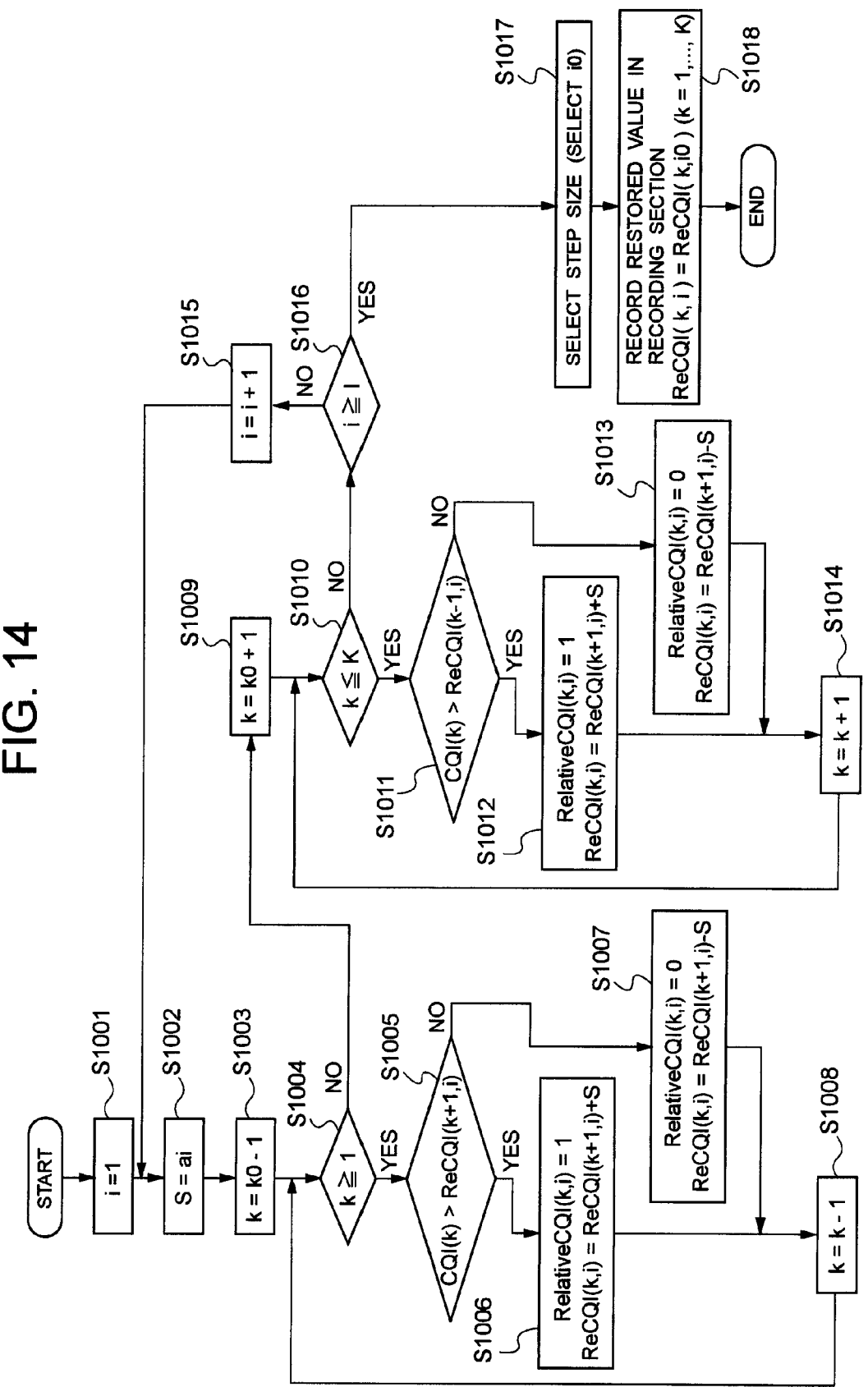
FIG. 14 is a flowchart showing details of step S805 in FIG. 9.

Now, a method for calculating the frequency relative value information R at step S805 in FIG. 9 and a method for generating CQI information using the information will be described with reference to FIG. 14. The frequency relative value calculating section 607 performs operations below. First, the frequency relative value calculating section 607 sets a variable i for selecting the step size S to one (step S1001) and makes the first step size S as ai (step S1002). Then, the reference RB deciding section 603 decides the reference RB number k0 by a predetermined rule, and sets k0−1 to the RB number k (step S1003). As a method for deciding the number k0 of the reference RB, it only needs to decide an initial value by using the frame number and go round all the RBs in the order of the number starting from the RB. As another method, a method using a RB number that is informed in advance or a method using the RB number of the maximum value, the minimum value or the intermediate value is also known. The RB number may be decided in advance according to the system. RelativeCQI(k, i) is the time relative value information RelativeCQI(k) for the step size ai.

For the RB number k that is smaller than the reference RB number k0 (YES at step S1004), the frequency relative value calculating section 607 decides the frequency relative value information based on whether the CQI value of the RB number k is bigger or smaller than the restored value of the adjacent RB number (k+1). If the CQI value of the RB number k is bigger than the adjacent RB number (k+1), the frequency relative value information for the RB number k is decided as one; and if the CQI value of the RB number k is smaller than the adjacent RB number (k+1), it is decided as zero. The frequency relative calculating section 607 calculates a reference value of each RB by adding the step size to the restored value of the RB number (k+1), if the relative value information is one; and by subtracting the step size from the restored value of the RB number (k+1), if the relative value information is zero (steps S1006, S1007 and S1008).

For the RB number k that is bigger than the reference RB number k0 (NO at step S1004), the frequency relative value calculating section 607 decides the frequency relative value information based on whether the CQI value of the RB number k is bigger or smaller than the restored value of the adjacent small RB number (k−1). If the CQI value of the RB number k is bigger than the adjacent RB number (k−1), the frequency relative value information for the RB number k is decided as one; and if the CQI value of the RB number k is smaller than the adjacent RB number (k−1), it is decided as zero. The frequency relative calculating section 607 calculates a restored value of each RB by adding the step size to the restored value of the RB number (k−1), if the relative value information is one; and by subtracting the step size from the restored value of the RB number (k−1), if the relative value information is zero (steps S1012, S1013 and S1014).

It repeats the abovementioned process until i becomes a predetermined value I, which is decided in advance (NO at steps S1015 and S1016). When i becomes I or more (YES at step S1016), it performs step size selection. In such a case, it selects the step size with the least error between the restored value obtained for each step size and the measured CQI value (step S1017).

As a method for selecting the step size, a method for calculating an optimal value in a least square approximation and selecting the step size closest to the value is known. For a method for calculating an error, the sum of absolute values of errors of all the RBs may be used. Alternatively, the sum of errors of the RBs with the biggest measured CQI value may be used. The MS-CQI recording section 602 records the restored value ReCQI(k; i0) that is calculated with the step size with the least error (i=i0) as the CQI(k; t−1) (step S1018). It informs the CQI information generating section 608 of the step size that is selected as the frequency relative value information RelativeCQI(k, i0) and the CQI value CQI0 of the reference RB. Then, in the CQI information generating section 608, the sending format 2 shown in FIG. 11 is generated.

The CQI based on the format generated in the abovementioned manner is transmitted. The numbers of bits required for transmitting are exemplified below:
For a system with the transmitting band of 5 MHz and the number of RBs being 12,
the time relative value information is 12 bits and the frequency relative value information is 16 bits.
For a system with the transmitting band of 10 MHz and the number of RBs being 24,
the time relative value information is 24 bits and the frequency relative value information is 28 bits.
For a system with the transmitting band of 20 MHz and the number of RBs being 48,
the time relative value information is 48 bits and the frequency relative value information is 52 bits.

The number of bits required for the step size information depends on the number of the prepared step sizes. Therefore, the number of the total bits of the format 1 or the format 2 is the abovementioned number of the bits added with the number of bits required for describing the step size.

Another method for calculating the relative value RelativeCQI(k, i) and the restored value ReCQI(k, i) will be described below. According to the method, the relative value RelativeCQI(k, i) in the RB number k is calculated by setting the step size to S and the restored value ReCQI(k0, i) for the reference RB number k 0 to the measured value CQI0.
If Err (k; "1")≦Err (k; "0"), RelativeCQI(k, i)=1
If Err (k; "1")>Err (k; "0"), RelativeCQI(k, i)=0
Here, Err (k; "1") and Err (k; "0") represent errors obtained by the next formulae, with "1" indicating the case where only the step size is added and "0" indicating the case where only the step size is subtracted.

If k < k0,
Err(k;"1")=|CQI(k)−ReCQI(k+1, i)+ S|
Err(k;"0")=|CQI(k)−ReCQI(k+1, i)− S|,
If k > k0,
Err(k;"1")=|CQI(k)−ReCQI(k−1, i)+ S|
Err(k;"0")=|CQI(k)−ReCQI(k−1, i)− S|.

The restored value ReCQI(k) of the RB is calculated in the manner below by using the decided relative value information.

k=k0 ReCQI(k, i)=CQI(k)
k<k0
If RelativeCQI(k, i)=1,
    ReCQI(k, i)=ReCQI(k+1, i)+S.
If RelativeCQI(k, i)=0,
    ReCQI(k, i)=ReCQI(k+1, i)−S.
K>k0
If RelativeCQI(k, i)=1,
    ReCQI(k, i)=ReCQI(k−1, i)+S.
If RelativeCQI(k, i)=0,
    ReCQI(k, i)=ReCQI(k−1, i)−S.

Although the compared result is indicated by two levels of big or small as represented by one bit notation in the calculation above, it may be indicated by four levels as represented by two bit notation. The calculation is performed as below.

If k < k0,
Err(k;"11")=|CQI(k)−ReCQI(k+1, i)+ 3×S|
Err(k;"01")=|CQI(k)−ReCQI(k+1, i)+ S|
Err(k;"00")=|CQI(k)−ReCQI(k+1, i)−S|
Err(k;"10")=|CQI(k)−ReCQI(k+1, i)−3×S|
If k > k0,
Err(k;"11")=|CQI(k)−ReCQI(k−1, i)+ 3×S|
Err(k;"01")=|CQI(k)−ReCQI(k−1, i)+ S|
Err(k;"00")=|CQI(k)−ReCQI(k−1, i)−S|
Err(k;"10")=|CQI(k)−ReCQI(k−1, i)−3×S|

If Err(k;"01") is the least among the four values, "01" is sent as the CQI information and the restored value is calculated as CQI(k)=ReCQI(k−1, i)+S.

Figure 15:
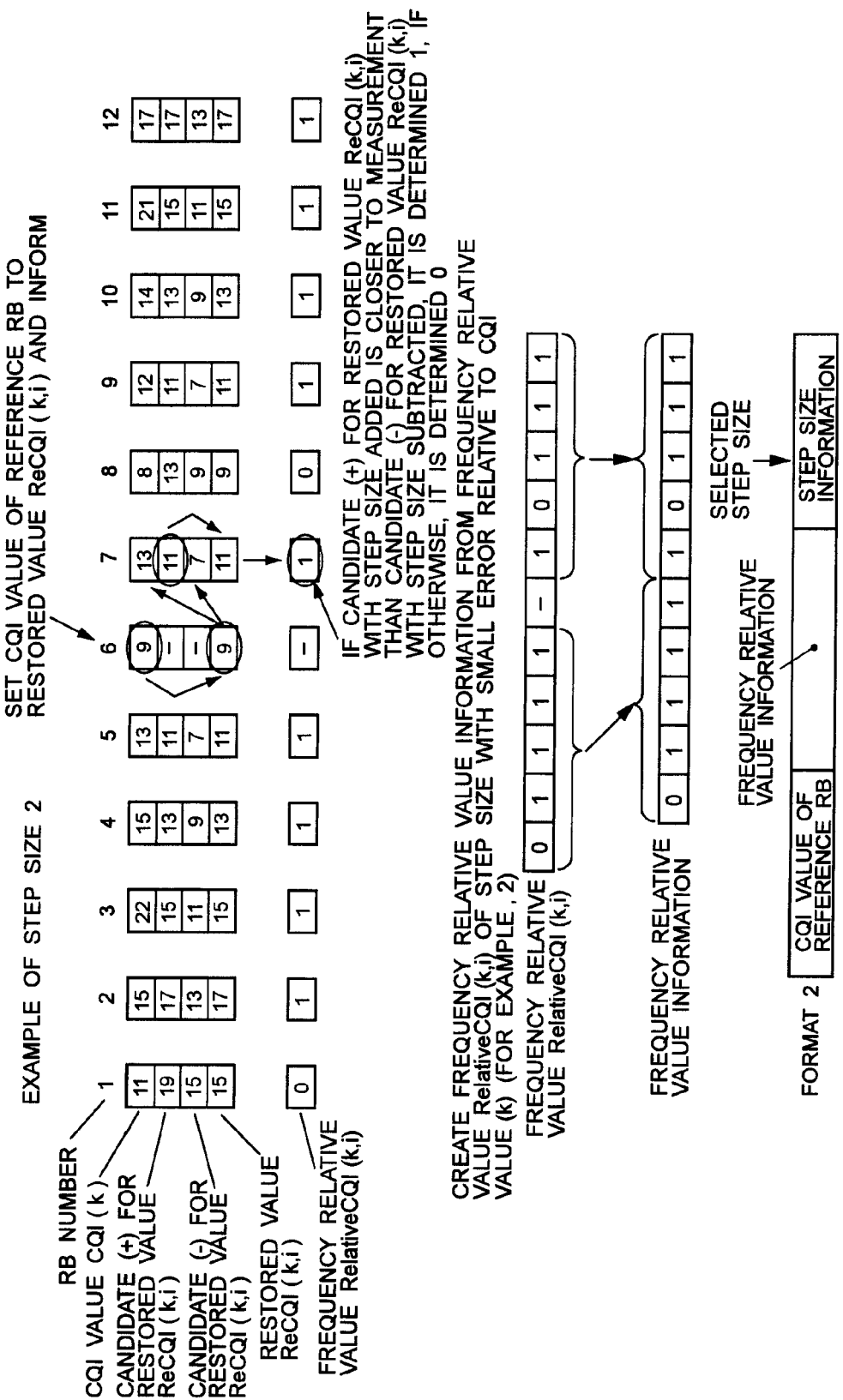
FIG. 15 is a diagram showing an example of a calculating operation of the frequency relative value information by the mobile station.

FIG. 15 shows an example of calculating operations of the frequency relative value information in the mobile station with the step size being 2. Referring to FIG. 15, the mobile station selects the reference RB, obtains two candidates for the restored value by increasing or decreasing the step size for each adjacent band in directions of higher and lower frequency by using the reference RB, and generates the relative value information of the restored value, which indicates the candidate for the restored value closest to the measured CQI value is which of the candidates for the restored value with the step size increased or decreased, as the frequency relative value information (bit map). Then, it obtains the restored value by using the relative value information for each of a plurality of step sizes and selects the step size with the restored value closest to the measured value. It informs the base station of the selected step size information, the CQI value of the reference RB, and the relative value information (bit map) of the restored value by the format 2 in FIG. 11. As the present embodiment is merely an example, and it is a matter of course that various modifications can be made.

Figure 16:
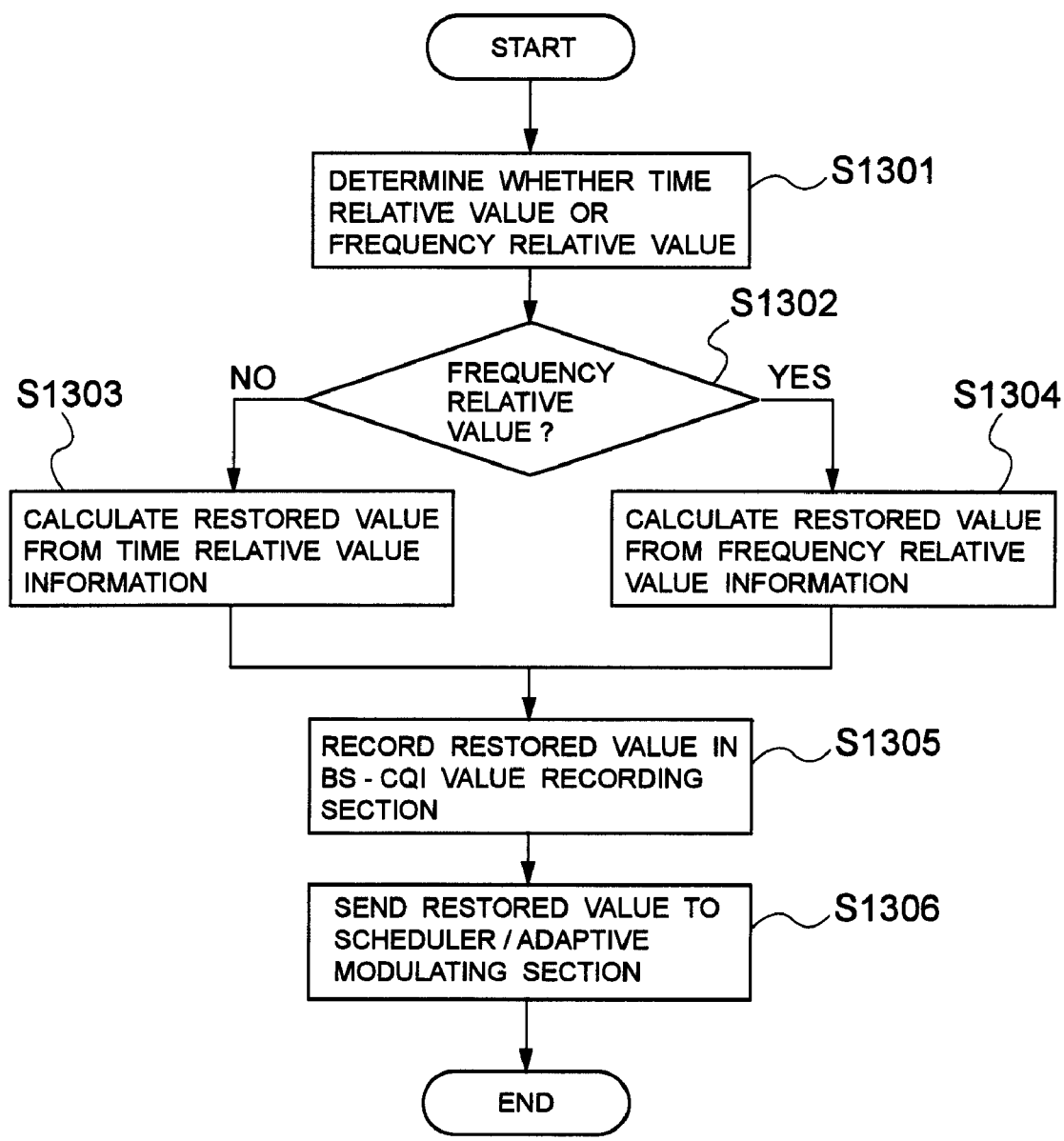
FIG. 16 is a flowchart showing operations of the base station in the first exemplary embodiment of the present invention.

Now, operations of the base station will be described with reference to the flowchart in FIG. 16. The base station detects a format of the CQI signal that is informed in the frame at the CQI receiving section 701. That is, in the frame of the frame number j, If mod (j, N)=0, the format is the format 2 (the frequency relative value information).

If mod (j, N)>0, the format is the format 1 (the time relative value information) (step S1301). Then, the relative value information according to each format and the step size S, and for the frequency relative value information, the CQI values of the reference RB and the like are retrieved. Then, in the CQI restoring section 702, a new CQI value in each RB is calculated (steps S1303 and S1304). The CQI value obtained by the calculation is recorded in the BS-CQI value recording section 703 (step S1305), while output to the scheduler/adaptive modulation section (step S1306).

Figure 17:
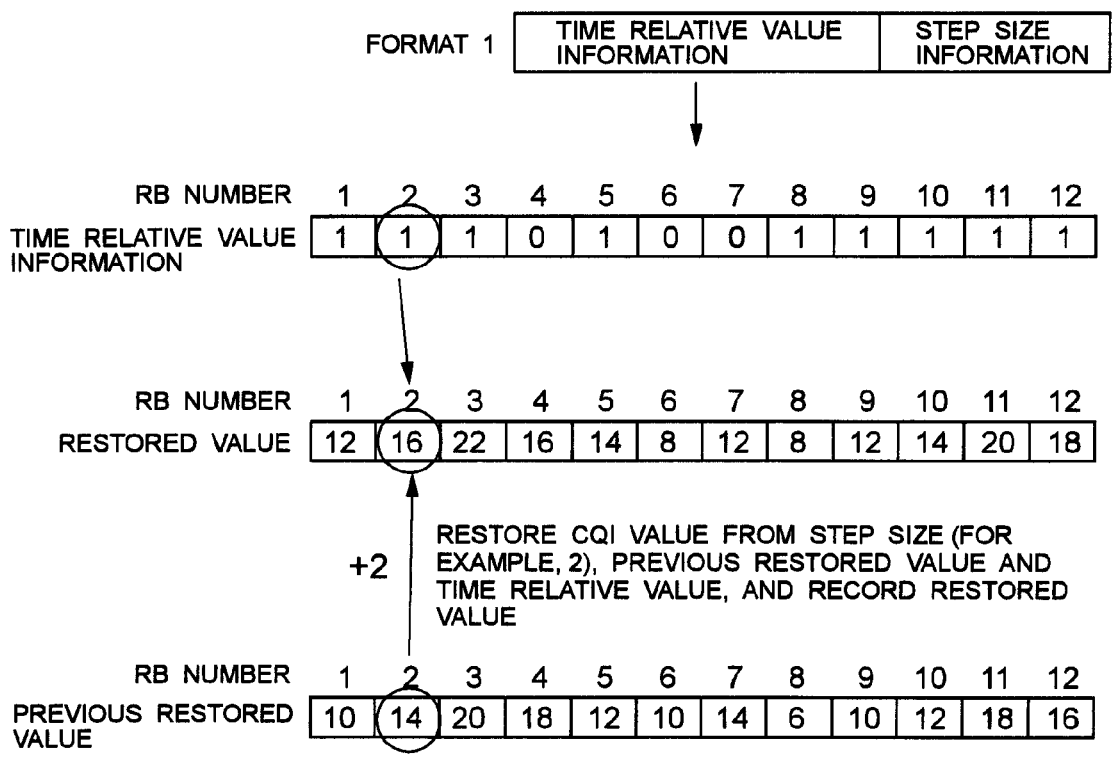
FIG. 17 is a diagram showing an example of a restoring operation of the CQI value according to the time relative value information by the base station.

FIG. 17 shows a method for obtaining a restored value from the time relative value information at step S1303. The CQI restoring section 702 calculates the new CQI value, in the same calculating method as that used in the mobile station, based on the previous restored value recorded in the BS-CQI recording section 703, the informed step size, and the time relative value for each RB retrieved at the CQI receiving section 701 and obtains the restored value.

That is, a calculation is performed as follows:

```
If RelativeCQI(k)=1:
    ReCQI(k; t)=CQI(k; t−1)+S.
If RelativeCQI(k)=0:
    ReCQI(k; t)=CQI(k; t−1)−S.
```

The new restored value obtained in such a manner is recorded in the BS-CQI recording section 703 to be used in calculating the next restored value.

The restoring method shown above is a method for a case where the time relative value information is represented by one bit notation. The same calculation as the exemplary calculation in the mobile station is used in the base station in the case of two bit notation.

Figure 18:
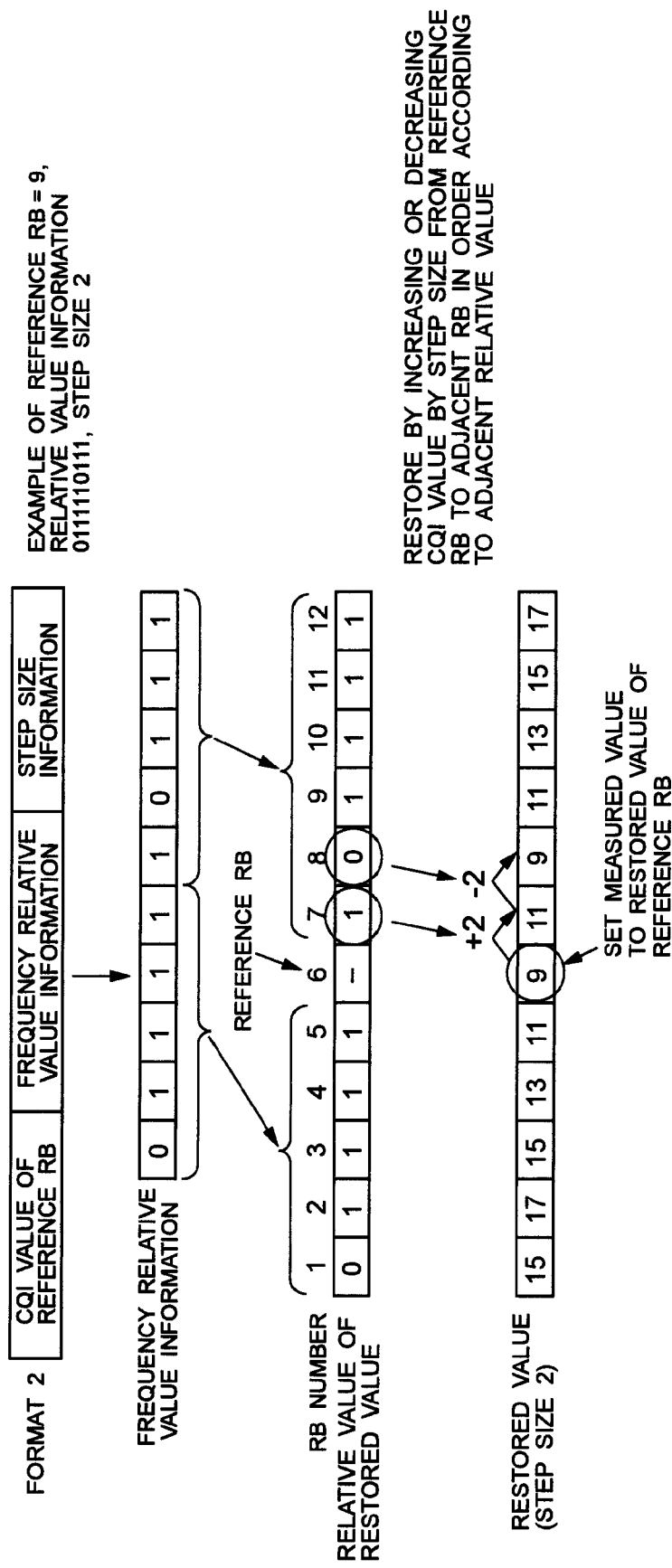
FIG. 18 is a diagram showing an example of a restoring operation of the CQI value according to the frequency relative value information by the base station.

FIG. 18 shows a method for obtaining a restored value from the frequency relative value information at step S1304. A restored value is obtained by increasing or decreasing the step size according to the relative value for the CQI value of the adjacent RB in the higher or lower direction from the reference RB in order by using the CQI value of the reference RB, the frequency relative value information and the step size information informed from the mobile station.

That is, the calculations below are performed:

```
k=k0   ReCQI(k)=CQI(k)
k<k0
If RelativeCQI(k)=1,
    ReCQI(k)=ReCQI(k+1)+S.
If RelativeCQI(k)=0,
    ReCQI(k)=ReCQI(k+1)−S.
k>k0
If RelativeCQI(k)=1,
    ReCQI(k)=ReCQI(k−1)+S.
If RelativeCQI(k)=0,
    ReCQI(k)=ReCQI(k−1)−S.
```

Although the abovementioned restoring method is a method in the case where the time relative value information is represented by one bit notation, the same calculation as the exemplary calculation of the mobile station is performed at the base station in the case of the two bit notation.

As mentioned above, in the first embodiment, the CQI signal information based on the time relative value notation is basically used, and the CQI signal information based on the frequency relative value notation is used in a predetermined cycle. By using the CQI signal based on the time relative value notation, the number of bits of the CQI signal can be reduced. Accordingly, it may have an advantage in reducing overhead in the uplink channel, increasing the throughput and the capacity in the uplink channel and reducing delay time. If a receiving error in a certain frame occurs at the base station in the case where the CQI signal based on the time relative value is used, a gap between the CQI values at the mobile station and the base station propagates to the frame thereafter. Then, in the embodiment, the gap is reset by using the frequency reference value notation, in a predetermined cycle, which informs the absolute value of the CQI value of the reference RB and the frequency relative value. Therefore, the gap is prevented from propagating by the reset.

As the reset is performed by using the CQI value of the reference RB and a relative value for the CQI value in the frequency direction, the number of bits of the CQI signal for resetting the gap between the CQI values at the mobile station and the base station is also reduced. Accordingly, it may have an advantage in reducing overhead in the uplink channel, increasing the throughput and the capacity in the uplink channel and reducing the delay time. For the reset, absolute values of the CQI values of all the RBs may be informed.

Second Exemplary Embodiment

The second exemplary embodiment will be described below. In the first embodiment, the time relative value is basically informed and the frequency relative value is informed to the base station in a predetermined cycle in order to correct a gap due to a receiving error at the base station. The second embodiment differs from the first embodiment in that relative value information on each of the time relative value and the frequency relative value is calculated at each frame and the relative value information of either the time relative value or the frequency relative value with a smaller error relative to the actual measurement is informed to the base station.

Since fluctuation of channel quality is influenced by a speed of the mobile station, geographic features and buildings in the place where the mobile station is present, the distance between the mobile station and the base station, and the like, it is differs for each mobile station. The fluctuations of channel quality in the frequency direction and in the time direction are caused by different factors. Therefore, the direction with a smaller fluctuation of channel quality differs for each mobile station and also changes as the mobile station moves. For example, the channel quality in the mobile station moving fast has a high fading fluctuation cycle so that a time fluctuation of channel quality is rapid. Therefore, if such a mobile station only uses the CQI information using the time relative value information, it cannot follow time fluctuation and an error between the measured CQI and the informed CQI, is increased.

Then in the embodiment, both the time relative value and the frequency relative value are calculated for each mobile station so that the relative value information more suitable for the mobile station can be used, and the mobile station selects the relative value with a smaller error with the measured CQI value and informs the selected relative value. That enables the mobile station to perform information suitable for each environment. As a result, accuracy in informing the CQI is increased as the entire system.

As the configurations of the mobile station and the base station in the second embodiment are the same as those in the first embodiment, they will be omitted from the description.

As a method for calculating the time relative value and the frequency relative value has been described in the first embodiment, it will be omitted from the description.

Figure 19:
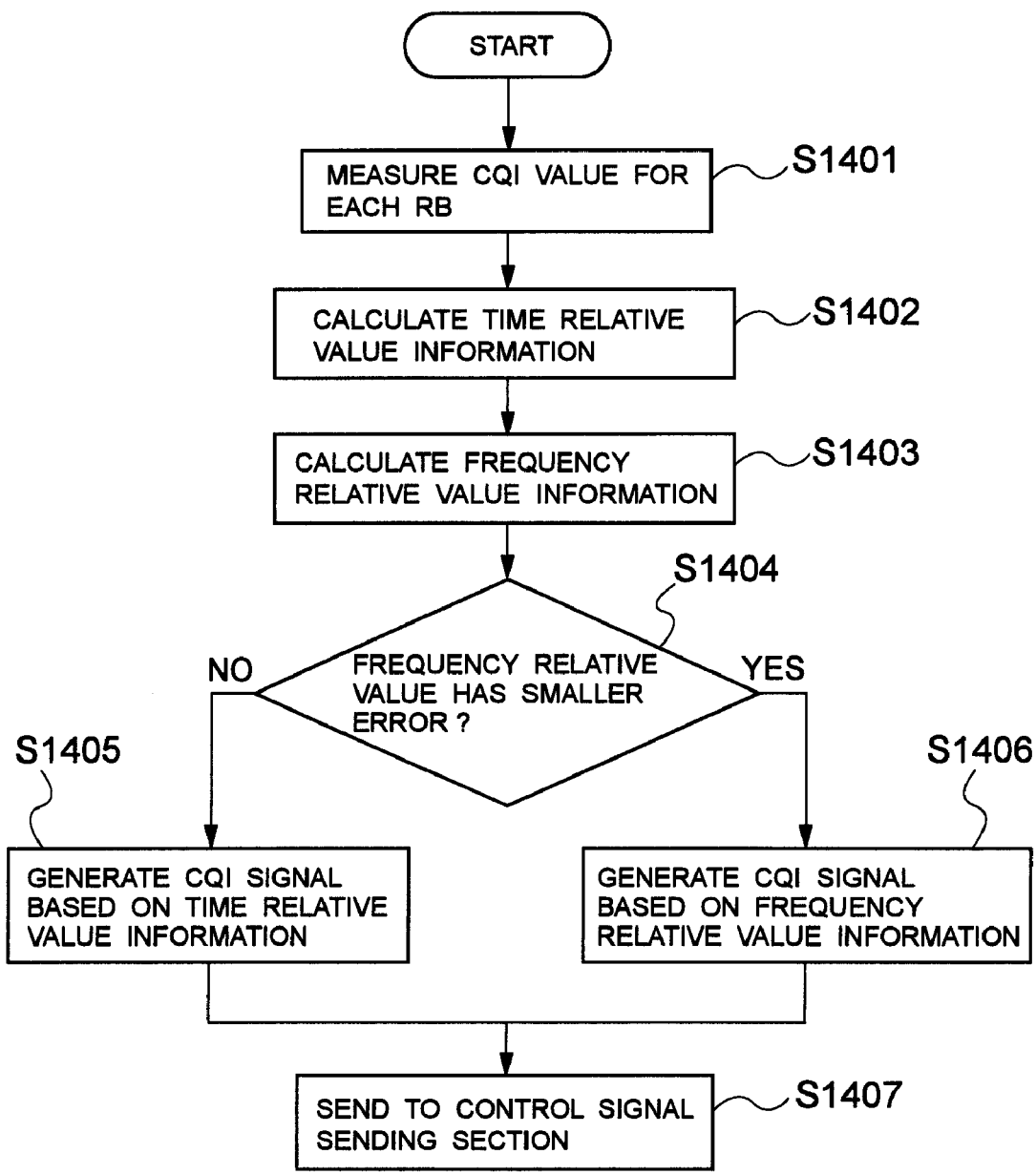
FIG. 19 is a flowchart showing operations of the mobile station according to the second exemplary embodiment of the present invention.

FIG. 19 is a flowchart showing operations of the present embodiment. The relative value calculating section 604 in the mobile station of the second embodiment calculates the time relative value information and the frequency relative value information for each frame (steps S1402 and S1403). The deciding section 606 calculates an error between the actual measurement of the CQI and a restored value based on each relative value information (step S1404). Here, the method for calculating the error may use the sum of the absolute values of errors (the error between the measured value and the restored value) of all RBs. Alternatively, the error of the RB with the biggest measured CQI may be used. Moreover, the total of the upper M errors (M is an integer of one or more) may be used.

The deciding section 606 calculates an error for each of the cases where the frequency relative value information is used and where the time relative value information is used, decides the relative value information of the case with a smaller error as the CQI signal to be sent in the frame, and sends the decided relative value information to the CQI information generating section 608. The CQI information generating section 608 generates the CQI signal according to the format corresponding to the received relative value information (steps S1405 and S1406).

Here, the format of each of the time relative value information and the frequency relative value information includes a flag indicating whether it is the time relative value information or the frequency relative value information in addition to information included in the format 1 and the format 2 of the first exemplary embodiment described above, like the format 3 and the format 4 in FIG. 20 and FIG. 21, respectively. The generated CQI signal is sent to the control signal sending section (step S1407). The flag is not limited to the one bit notation and may be sent separately without being included in the format 3 or 4.

Figure 22:
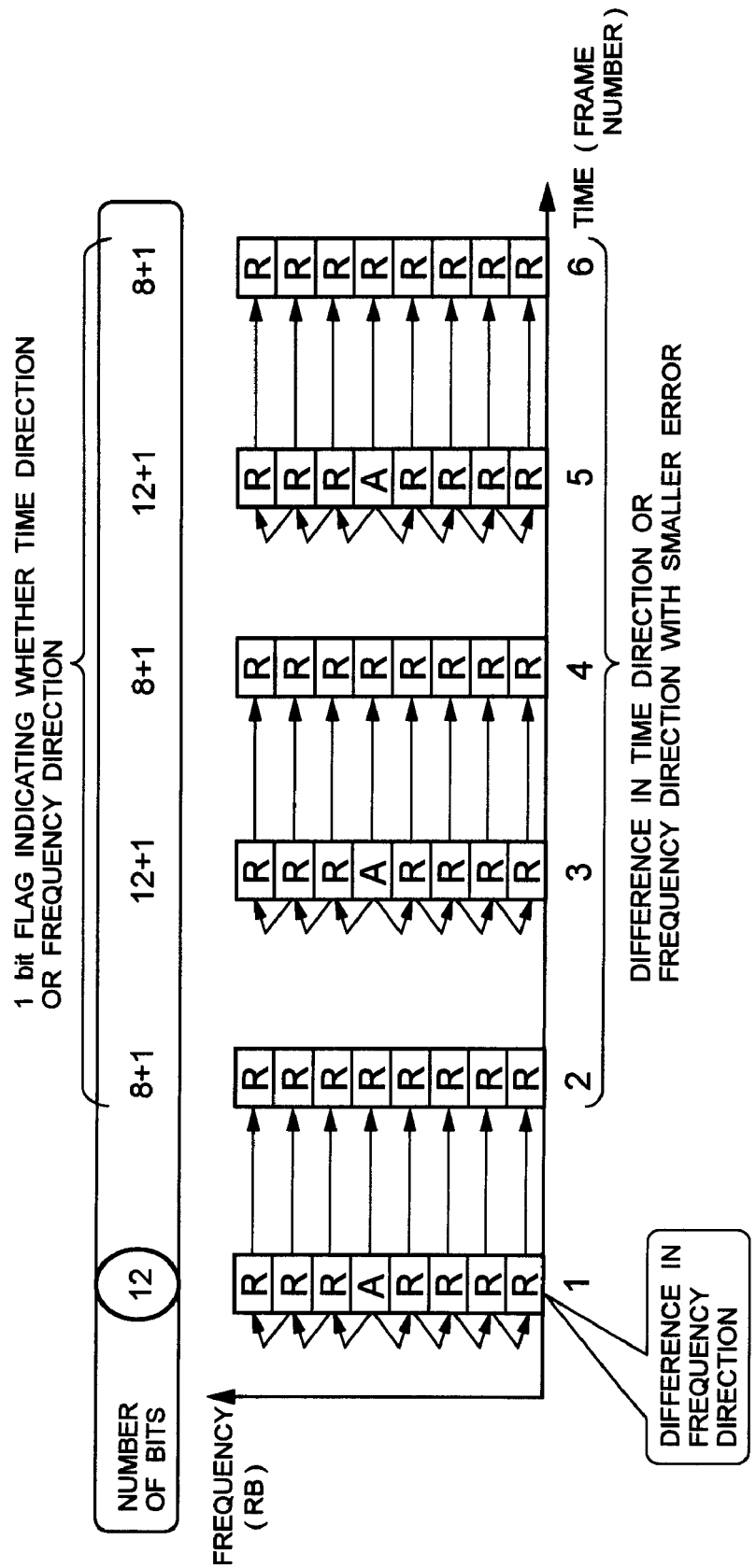
FIG. 22 is a diagram for illustrating a method for informing the CQI value in the second exemplary embodiment of the present invention.

FIG. 22 is a diagram for illustrating an operational principal of the present embodiment. As in FIGS. 2 and 6, A indicates the absolute value information, R indicates the relative value information. The relative value information R includes the time relative value information in the time axis direction and the frequency relative value information in the frequency axis direction. In FIG. 22, at the timing of the first frame and the fifth frame, in order to reset a gap between the CQI values in the mobile station and the base station, the CQI value of the reference RB is represented as the absolute value information A, and the frequency relative value information R is made by using differences between the CQI values in the higher and lower direction of the frequency in order with the reference RB as a reference. For the other frames, the error is calculated for each of the cases where the frequency relative value information is used and where the time relative value information is used, the CQI information is generated by using the relative value information with a smaller error and the CQI information is informed to the base station.

As described in the first exemplary embodiment, if a receiving error occurs in a certain frame at the base station and a gap occurs between the CQI values in the base station and the mobile station when the time relative value information is used, that gap will be taken over in frames thereafter as long as the time relative value information is correctly received in the base station. In order to solve the problem, the present embodiment is adapted to reset the gap by sending the frequency relative value information in a predetermined cycle in spite of degree of the errors of the frequency relative value information and the time relative value information. The cycle for resetting the gap needs not to be constant and the gap may be reset at a predetermined frame timing. When the gap is reset, the measured CQI values of all RBs may be informed of by using the absolute value information.

As mentioned above, in the second exemplary embodiment, the time relative value information and the frequency relative value information are calculated for each frame, and the relative value information with smaller error relative to the restored value based on the measured value and each of the relative value information is informed. Accordingly, in addition to the advantages described in the first embodiment, the present embodiment can inform the more suitable information according to the conditions of the wireless propagation channel between each of the mobile station and the base station.

Therefore, the mobile station that moves fast with rapid time fluctuation of the channel quality informs the frequency relative value information more frequently than the time relative value information so that an error between the restored value and the measured value can be reduced. The present invention can reduce a difference between the measured value and the restored value of the CQI signal like this. Therefore, the present invention has advantages of improving accuracy of the scheduling effect and the adaptive modulation in the base station, improving the throughput of the downlink channel transmission and reducing the packet sending delay.

Third Exemplary Embodiment

The third exemplary embodiment of the present invention will be described below. In the second exemplary embodiment, the relative value information of each of the time relative value and the frequency relative value is calculated for each frame and the relative value information with a smaller error relative to the actual measurement is informed. The third exemplary embodiment differs from the second exemplary embodiment in that the time relative value information and the absolute value information represented by the smaller number of bits with rougher quantization level are calculated and the information with a smaller error relative to the actual measurement is informed.

For example, it is assumed that the number of RBs is eight, the relative value information is one bit, and the quantization level in A/D (analog/digital) conversion is made rougher than the level (represented by five bits) defined by the system, to make the absolute value information two bits. Then, the time relative value information can represent the CQI information of eight RBs by 8 bits (=1 bit×8 RBs). In contrast, when the absolute value information with the rougher quantization level is used, 2 bits×8=16 bits are required for representing the CQI information of eight RBs to increase the number of bits required for the relative value information. In the latter case, however, the number of bits required can be less than the number of pieces of the CQI information for representing all RBs in five bits.

As described in the second embodiment, fluctuation of the channel quality differs for each mobile station. Thus, there are cases with a small channel fluctuation and a big channel fluctuation. In the case of the bigger channel fluctuation, the relative value information cannot follow the actual quality to increase an error. In such a case, it is preferable to use the absolute value information. On the other hand, in the case of the smaller channel fluctuation, the relative value information can ensure enough quality, further decreasing the number of bits required than the absolute value information. In such a case, it is preferable to use the relative value information.

Then, in the present embodiment, both of the time relative value information and the absolute value information are calculated for enabling a informing method suitable for each mobile station to be used so that the mobile station can select the information with a smaller error relative to the measured CQI value and inform the information. That makes the mobile station perform suitable information according to each environment and accuracy of CQI information as the entire of the system is improved.

Figure 23:
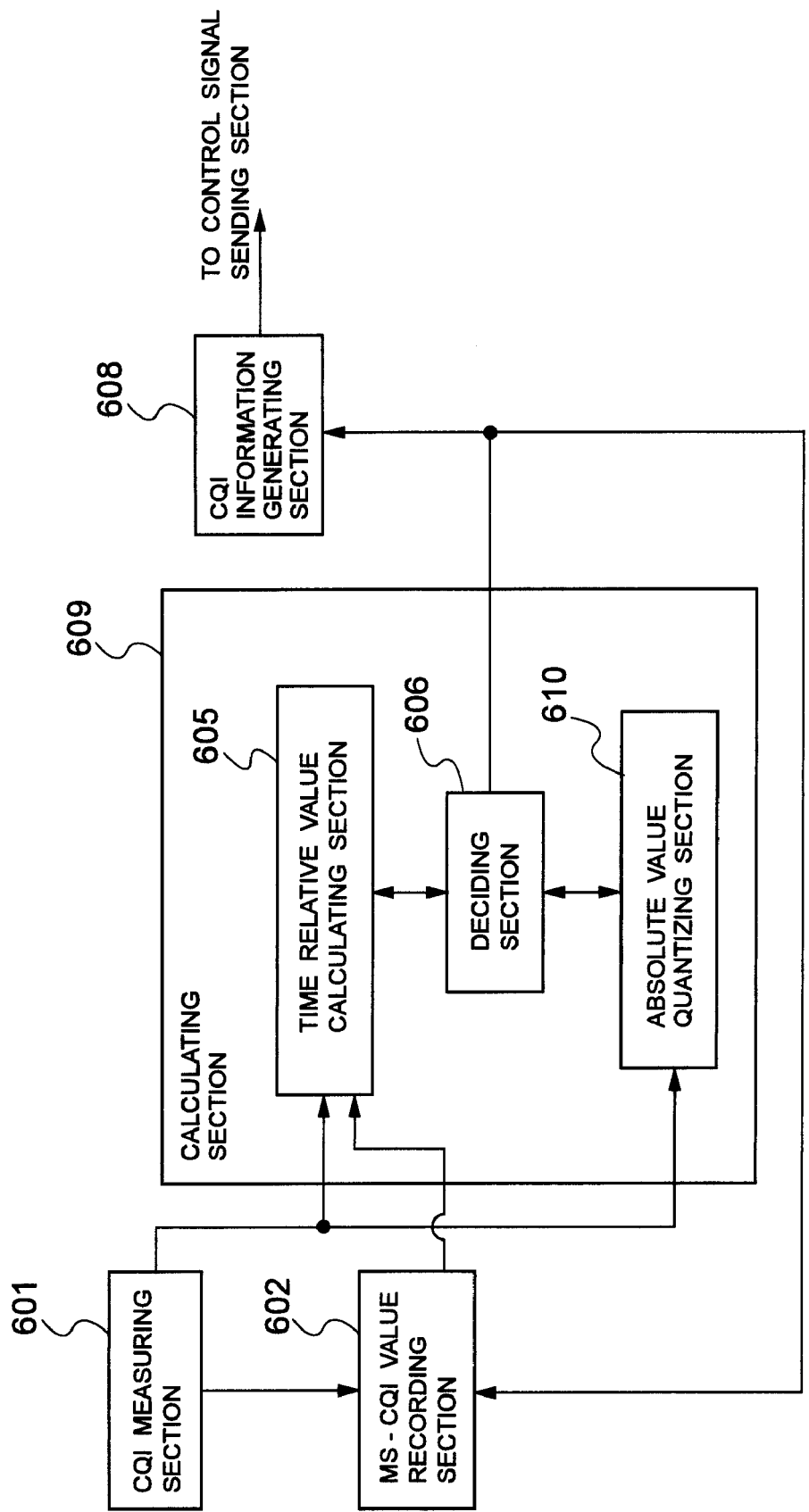
FIG. 23 is a block diagram of the mobile station in the third exemplary embodiment of the present invention.

FIG. 23 is a functional block diagram of a mobile station in the present embodiment. The same parts as those in FIG. 7 are denoted by the same reference numerals. In FIG. 23, a CQI measuring section 601 measures the CQI value of each RB, and an MS-CQI value recording section 602 records the measured CQI value and the previous CQI value for calculating the time relative value information R. A calculating section 609 includes the time relative value calculating section 605 for calculating the time relative value information, an absolute value quantizing section 610 for performing absolute value quantization on the measured CQI value, and the deciding section 606 for outputting the calculated result with a smaller error relative to the actual measurement from the calculated results from the time relative value calculating section 605 and the absolute value quantizing section 610. The CQI information generating section 608 for generating information to be sent to the base station by using the information selected by the deciding section 606 is also included in the figure. The deciding section 606 selects the information with a smaller error relative to the measured CQI value from the time relative value information and the absolute value information calculated by the time relative value calculating section 605 and the absolute value quantizing section 610, and informs the information to the CQI information generating section 608. If the selected information is the time relative value information, the deciding section 606 records the decided restored value in the MS-CQI value recording section 602. If the selected information is the absolute value, it records the absolute value in the MS-CQI value recording section 602. As the configuration of the base station of the present embodiment is the same as that of the first embodiment, it will be omitted from the description.

Figure 24:
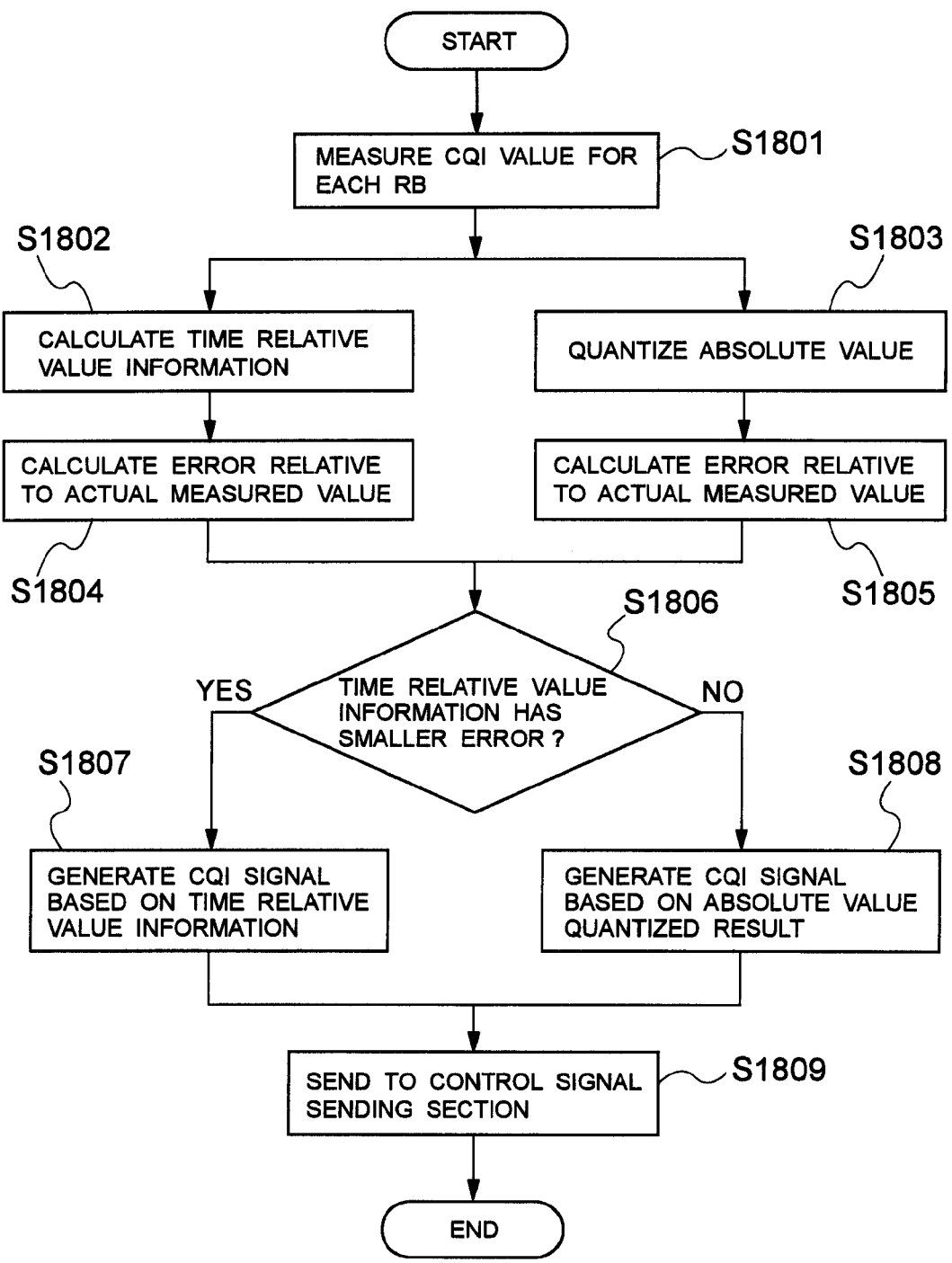
FIG. 24 is a flowchart showing operations of the mobile station in the third exemplary embodiment of the present invention.

FIG. 24 is a flowchart showing operations of the present embodiment. By using the measured CQI value for each RB by the CQI measuring section 601 (step S1801), the time relative value information is calculated in the time relative value calculating section 605 (step S1802), and the absolute value quantization is performed in the quantizing section 610 (step S1803). In the absolute value quantizing section 610, the absolute value information is represented by two bits, for example, by making it rougher than five bits which are the quantization bits defined in the system.

Then, in the deciding section 606, an error between the actual measured CQI value and the time relative value information is calculated (step S1804) and an error between the actual measured CQI value and the result quantizing the absolute value (referred to as absolute value quantized result) is calculated (step S1805). The CQI signal is generated based on the result with a smaller error (steps S1806 to 1808) and sent to the control signal sending section (step S1809).

Assuming that the number of information bits for 1RB after quantization is two bits, the CQI value can be informed by four kinds from 0 to 3 in two bit notation in the embodiment. It is assumed that each of the mobile station and the base station keep a quantizing table shown in FIG. 25 in advance, as an example. In this table, the modulation method which is a suitable sending form calculated based on the SIR of the pilot signal, a block size, and a power offset are used as an indicator of the CQI value as mentioned above. If the CQI value is 1, 4, 7 or 10, it will be "0(00)", "1(01)", "2(10)" and "3(11)" in two bit notations, respectively.

The absolute value quantizing section 610 in the mobile station selects the CQI value corresponding to the quality value closest to the quality information of each RB that is sent from the CQI measuring section among the CQI values in the quantizing table shown in FIG. 25 and makes the CQI value as the CQI value of the RB. Here, it is assumed that the CQI value to be selected is that with the smallest error relative to the measured value, however, the embodiment of the present invention is not limited to that and may select that closest to the measured value among the quality values smaller than the measured value.

As described in the second embodiment, the deciding section 606 in the mobile station receives the time relative value information and the quantized absolute value information for each frame, calculates an error relative to each measured value, and decides to use the informing method with a smaller error in the frame. As the deciding method and the processing thereafter are the same as those of the second embodiment, they will be omitted from the description.

As described in the first embodiment, if a receiving error occurs in a certain frame at the base station and a gap occurs between the CQI values in the base station and the mobile station when the time relative value information is used, that gap will be taken over in frames thereafter as long as the relative value information is correctly received in the base station. In order to solve the problem, in the present embodiment, the absolute value information may be sent in a predetermined cycle in spite of degree of the errors of the absolute value information and the relative value information.

Although it is assumed that the relative value information is one bit an the absolute value information is two bits here, the scope of the present invention is not limited to this and any number of bits may be set. For example, both the relative value information and the absolute value information are set two bits. In this case, as the total number of bits of both kinds of information is the same, there is an advantage that the format of the control signal fields can be unified. In such a case, there is no advantage in reducing the number of bits by using the relative value information, though, using of the relative value information makes information more accurate when the time fluctuation is small by setting the step size of the relative value to smaller than the granularity that can be informed in the absolute value information.

As mentioned above, in the third embodiment, the time relative value information and the quantized absolute value information are calculated for each frame, and the information with smaller error relative to the restored value based on the measured value and each piece of the relative value information is informed. Accordingly, in addition to the advantages described in the first embodiment, the present embodiment can inform the more suitable information according to the conditions of the wireless propagation channel between each of the mobile station and the base station. Therefore, the mobile station that moves fast with rapid time fluctuation of the channel quality informs the quantized absolute value information more frequently so that an error between the restored value and the measured value can be reduced. If the mobile station moves slowly, the number of information bits can be reduced by using the time relative value information or the reduced information bit space can be used for sending another signal.

According to the present invention, the number of information bits to be used is reduced and a difference between the measured value and the restored value of the CQI signal can be decreased than in the case where the quantized absolute value information is always performed. By this, accuracy of the scheduling effect and the adaptive modulation in the base station can be improved, and the throughput of the downlink channel transmission is also improved and the packet sending delay is reduced.

Although the time relative value information and the quantized absolute value information are calculated for each frame and the information with a smaller error relative to the restored value based on the measured value and each piece of information is informed in the embodiment, the invention may be adapted to inform the quantized absolute value information at periodical frame timings and inform the time relative value information at the other frame timings. The cycle for informing the quantized absolute value information may be flexible (changeable).

Fourth Exemplary Embodiment

In the third embodiment, the information with a smaller error relative to the actual measurement in the time relative value information (for example, one bit) and the absolute value information, which is represented by the smaller number of bits (for example, two bits) with rougher quantization level, is informed. The fourth exemplary embodiment is different from the third embodiment in that the absolute value information is divided into two or more frames and sent. For example, in the fourth embodiment, the absolute value information is divided into two frames and sent. The purpose is to make the numbers of bits in the absolute value information and the relative value information the same. If the numbers of bits are the same, the kinds of information can be unified in the same transmission form (a coding rate or a modulation method) for simplifying the implementation. The number of bits of the absolute value information and the number of frames to be divided are not limited to two, and the absolute value information bigger than two bits may be divided into more than two frames and sent.

FIG. 26 is a diagram for illustrating a method for informing the CQI value in the fourth embodiment. The block diagram of the base station is the same as that of the third embodiment shown in FIG. 23. As shown in FIG. 26, RB1 to RB8 are divided into two groups of the group RB1 to RB4 and the group RB5 to RB8. The absolute value information RAs (Rough Absolute) of the first group are sent in the $n^{th}$ frame and the absolute value information RAs of the second group are sent in the next $n+1^{th}$ frame. Accordingly, when RA of each RB is two bits and R is one bit, the number of sending bit is eight bits in all frames. As a result, the numbers of bits of the absolute value information RA and the relative value information R may be the same.

In the CQI information generating section 608 in FIG. 23, the absolute value information RA is divided into two groups and sent as mentioned above. Although FIG. 26 shows a case where the time relative value information R is sent in the $n+2^{th}$ frame to the $n+4^{th}$ frame, the present invention is not limited to that. As the configuration of the base station is the same as that in the abovementioned embodiment, it will be omitted from the description. The embodiment shown in FIG. 26 can also be applied to the case where the absolute value information A and the relative value information R described in FIG. 2 are sent.

As a modification of the fourth embodiment, the case shown in FIG. 27 may be considered. In the example shown in FIG. 26, when the absolute value information RA is divided into two frames and sent, RBs are divided into two groups and RA of one group is sent in one frame. In the embodiment, RA of two bits for 1RB is divided into the group of the first bit and the group of the second bit as shown in FIG. 27, and RA of two bits for each RB is sent by one bit for each frame. When a certain RB is "01", "0" and "1" are sent by the frame number n and n+1, respectively.

A method for setting information bit by informing whether the first bit of RA of two bits is bigger or smaller than the half of the CQI value so that the second bit can finally identify any one of the four bits can be considered. That is, when it is represented as CQI0 and CQI1 in the CQI representation of two bits, the first bit is considered as "0", and when it is represented as CQI2 and CQI3, the first bit is considered as "1". That enables the base station to obtain information on whether the CQI is bigger than the half or not when the base station receives the frame number n. Therefore, the base station can perform control until the acquisition of the frame number n+1 by using the intermediate value between the CQI0 and CQI1 or the CQI2 and the CQI3 as a channel quality of the RB. The example shown in FIG. 27 can be applied when the absolute value information is sent in the case described in FIG. 2 in which the absolute value information A and the relative value information R are sent.

As a modification of the fourth embodiment, the case below can be considered. A plurality of sets of CQI values in two bit notation are prepared so that a suitable set can be selected based on an average channel quality of each mobile station. Accordingly, as the range informed in two bits notation become thinner, an error due to quantization is also reduced. That enables more accurate information to be performed.

That is, if the number of CQI values are large, a range for informing by the CQI value in two bit notation is specified in advance. For example, two sets of CQI values in two bits notation is prepared for the high CQI range and the low CQI range. A set to be used among the two sets may be decided in such a method as the mobile station measures the receiving quality of the pilot signal in the downlink channel, and if the measured quality is at the predetermined threshold or higher, it is decided to use the set for the high CQI range, and if the measured quality is lower than the threshold, it is decided to use the set for the low CQI range.

The mobile station performs the decision and informs the result to the base station by using the control signal in the uplink channel before measuring the CQI. The mobile station may inform the measurement of the receiving quality of the pilot signal to the base station, and the base station may decide whether the set for the high range or the set for the low range is used, and inform the decision to the mobile station. Even after the CQI information started, the mobile station may measure the receiving quality of the downlink pilot signal in a predetermined cycle and update the CQI information range based on the measurement. This example can be applied to sending the absolute value information in the case described in FIG. 2 in which the absolute value information A and the relative value information R are sent.

Although the mobile station informs the CQI value at each frame in the abovementioned first to the fourth exemplary embodiments, the scope of the present invention is not limited to this. That is, the mobile station may decide a frame for which the CQI value is informed based on a predetermined cycle or predetermined conditions. The step size information in the sending format to the base station is not necessarily needed. For example the step size may be decided as one. In such a case, the amount of information is further reduced by the number of bits corresponding to the step size information. The mobile station may inform the CQI values for all RBs included in the system band, or may inform the CQI values for only a particular RBs, such as a set of RBs previously specified from the base station by using the control signal in the downlink channel. It is apparent that the operations in the abovementioned embodiments may be adapted to be stored on a recording medium such as a ROM with the operational procedures as programs to be read and executed by a computer.

According to the present invention, the usage rate of wireless resources required for informing the CQI can be reduced. That may be advantageous in reducing overhead in the uplink channel and improving efficiency of wireless usage rate for sending the uplink channel data. That may be also advantageous in improving the capacity and throughput in the uplink channel and a coverage of the service area for the base station.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:
   a section for representing the measured communication channel qualities of the partial bands by relative value information in a frequency direction and sending the relative value information to said base station as said communication channel quality information at a first timing, the relative value information in the frequency direction representing a difference in the communication channel qualities of the partial bands at the first timing; and
   a section for representing the measured communication channel qualities of the partial bands by relative value information in a time direction and sending the relative value information to said base station as said communication channel quality information at a second timing, the relative value information in the time direction representing a difference between the communication channel qualities of the partial bands at the second timing and the communication channel qualities of the partial bands at a time prior to the second timing.

2. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:
   a section for representing the measured communication channel qualities of the partial bands by relative value information in a frequency direction, the relative value information in the frequency direction representing a difference in the communication channel qualities of the partial bands at a first timing;
   a section for representing the measured communication channel qualities of the partial bands by relative value information in a time direction, the relative value information in the time direction representing a difference between the communication channel qualities of the partial bands at the first timing and the communication channel qualities of the partial bands at a time prior to the first timing;
   a section for calculating a first error for said relative value information in the time direction;
   a section for calculating a second error for said relative value information in the frequency direction; and
   a section for sending said relative value information in the frequency direction to said base station as said communication channel quality information if the second error is smaller than the first error, and sending said relative value information in the time direction to said base station as said communication channel quality information if the first error is smaller than the second error,
   wherein the first error and second error represent the measured communication channel qualities relative to restored channel quality information.

3. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:
   a section for representing the measured communication channel qualities of the partial bands by relative value information in a time direction, the relative value information in the time direction representing a difference between communication channel qualities of the partial bands at a first time and the communication channel qualities of the partial bands at a time prior to the first time;
   a section for representing the measured communication channel qualities of the partial bands by quantization level information which is rougher than the quantization level defined in the system; and
   a section for sending the information with a smaller error relative to said measurements among said relative value information in the time direction and said quantization level information to said base station as said communication channel quality information,
   wherein said quantization level information represents the measured communication channel qualities of the partial bands using a smaller number of bits than the number of bits of the quantization level defined in the system.

4. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:
   a section for representing the measured communication channel qualities of the partial bands by relative value information in a time direction, the relative value information in the time direction representing a difference between communication channel qualities of the partial bands at a first time and the communication channel qualities of the partial bands at a time prior to the first time;
   a section for representing the measured communication channel qualities of the partial bands by quantization level information which is rougher than the quantization level defined in the system; and
   a section for sending said quantization level information at a certain timing and said relative value information in the time direction at other timings to said base station as said communication channel quality information, wherein said quantization level information represents the measured communication channel qualities of the partial bands using a smaller number of bits than the number of bits of the quantization level defined in the system.

5. A communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at the mobile station, said method comprises:

representing the measured communication channel qualities of the partial bands by relative value information in a frequency direction, and sending the relative value information to said base station as said communication channel quality information at a first timing, the relative value information in the frequency direction representing a difference in the communication channel qualities of the partial bands at the first timing; and representing the communication channel qualities of the partial bands by relative value information in a time direction and sending the relative value information to said base station as said communication channel quality information at a second timing, the relative value information in the time direction representing a difference between the communication channel qualities of the partial bands at the second timing and the communication channel qualities of the partial bands at a time prior to the second timing.

6. A communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the measured communication channel qualities of the partial bands by relative value information in a frequency direction, the relative value information in the frequency direction representing a difference in the communication channel qualities of the partial bands at a first timing;

representing the communication channel qualities of the partial bands by relative value information in a time direction, the relative value information in the time direction representing a difference between the communication channel qualities of the partial bands at a first timing and the communication channel qualities of the partial bands at a time prior to the first timing;

calculating a first error for said relative value information in the time direction;

calculating a second error for said relative value information in the frequency direction; and sending said relative value information in the frequency direction to said base station as said communication channel quality information if the second error is smaller than the first error, and sending said relative value information in the time direction to said base station as said communication channel quality information if the first error is smaller than the second error, wherein the first error and second error represent the measured communication channel qualities relative to restored channel quality information.

7. A communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the measured communication channel qualities of the partial bands by relative value information in a time direction, the relative value information in the time direction representing a difference between communication channel qualities of the partial bands at a first time and the communication channel qualities of the partial bands at a time prior to the first time;

representing the measured communication channel qualities of the partial bands by quantization level information which is rougher than the quantization level defined in the system; and sending the information with a smaller error relative to said measurements among said relative value information in a time direction and said quantization level information to said base station as said communication channel quality information, wherein said quantization level information represents the measured communication channel qualities of the partial bands using a smaller number of bits than the number of bits of the quantization level defined in the system.

8. A communication method in a communication system for measuring communication channel qualities of one or more partial bands of a communication band in a downlink channel that is divided into a plurality of partial bands in a mobile station and sending the measurements to a base station as communication channel quality information via an uplink channel, wherein, at said mobile station, said method comprises:

representing the measured communication channel qualities of the partial bands by relative value information in a time direction, the relative value information in the time direction representing a difference between communication channel qualities of the partial bands at a first time and the communication channel qualities of the partial bands at a time prior to the first time;

representing the measured communication channel qualities of the partial bands by quantization level information which is rougher than the quantization level defined in the system; and sending said quantization level information at a certain timing and said relative value information in a time direction at other timings to said base station as said communication channel quality information, wherein said quantization level information represents the measured communication channel qualities of the partial bands using a smaller number of bits than the number of bits of the quantization level defined in the system.

9. A communication system comprising a mobile station and a base station, wherein said mobile station comprises:

a measuring section for measuring communication channel qualities of one or more partial bands of a communication band in a downlink channel that is divided into a plurality of partial bands; and an information sending section for sending the measurements to a base station as communication channel quality information in an uplink channel, wherein said mobile station:

represents a measured communication channel quality at a first timing of a first partial band by a first code as communication channel quality information of the first partial band, represents a measured communication channel quality at the first timing of a second partial band, which is different from the first partial band represented by the first code by a second code as communication channel quality information of the second partial band by using said first code as a reference, the second code representing a difference in the measured channel communication qualities of the first partial band and the second partial band at the first timing and sends the communication channel quality information represented by said first code and said second code to the base station using said information sending section; and represents the communication channel quality information at a second timing of partial bands represented by said first code or said second code by a third code by using communication channel quality information of the partial band represented by said first code or said second code at a timing other than the second timing as a reference and sends the communication channel quality information represented by said third code to the base station using said information sending section.

10. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a first section for representing a measured communication channel quality of a first partial band by a first code as communication channel quality information of the first partial band and representing a measured communication channel quality of a second partial band, which is different from the first partial band represented by said first code, by a second code as communication channel quality information of the second partial band by using said first code as a reference, the second code representing a difference in the measured channel communication qualities of the first partial band and the second partial band at a first timing;

a second section for representing the communication channel quality information of partial bands represented by said first code or said second code by a third code by using communication channel quality information of the partial band represented by said first code or said second code at a prior timing as a reference; and a third section for selectively sending information obtained by said first section and said second section to the base station.

11. A communication system for measuring communication channel qualities of one or more partial bands of a communication band in a downlink channel that is divided into a plurality of partial bands in a mobile station and sending the measurements to a base station as communication channel quality information via an uplink channel, wherein said mobile station comprises:

a first section for representing communication channel quality information of a partial band represented by a first code or a second code at a prior timing, by a third code by using said first code or said second code as a reference, said third code representing a difference between communication channel quality of the partial band at a current time and the communication channel quality of the partial band at the prior timing;

a second section for representing the communication channel quality of the partial band by quantization level information which is rougher than the quantization level defined in the system; and a third section for selectively sending the information obtained by said first section and said second section to the base station, wherein said quantization level information represents the communication channel quality of the partial band using a smaller number of bits than the number of bits of the quantization level defined in the system.

12. The communication system according to claim 10, wherein said third section sends the information with a smaller error relative to said measurements among the information obtained by said first section and said second section to said base station as said communication channel quality information.

13. A communication system for measuring communication channel qualities of one or more partial bands of a communication band in a downlink channel that is divided into a plurality of partial bands in a mobile station and sending the measurements to a base station as communication channel quality information via an uplink channel, wherein the mobile station comprises:

a first section for representing a communication channel quality of said one or more partial bands by a code based on a first format;

a second section for representing a communication channel quality of said one or more partial bands by a code based on a second format which is different from said first format; and a third section for selectively sending information represented by said first format and said second format according to errors between the measured communication channel quality and each code based on said first format and said second format to said base station, wherein the errors represent the measured communication channel qualities of said one or more partial bands relative to the codes based on the first and second format.

14. The communication system according to claim 13, wherein a communication channel quality of at least one partial band, which is said measurement, is represented by a first code as communication channel quality information and a communication channel quality of at least one partial band which is different from the partial band represented by said first code, which is said measurement, as communication channel quality information by a second code by using a communication channel quality of any partial band represented by said first code as a reference as said first format; and the communication channel quality information of partial bands represented by said first code or said second code is represented by a third code by using communication channel quality information of a partial band represented by said first code or said second code at a timing before in time as a reference as said second format.

15. The communication system according to claim 13, wherein the communication channel quality information of partial bands represented by the first code or the second code is represented by a third code by using communication channel quality information of a partial band represented by said first code or said second code as a reference at a timing before in time as said first format; and the communication channel qualities of the partial bands, which are said measurements, are represented by quantization level information which is rougher than the quantization level defined in the system as said second format.

16. The communication system according to claim 9, wherein each of said second code and said third code is a code indicating to increase or decrease a communication channel quality, which makes a reference, by a predetermined step size.

17. The communication system according to claim 16, wherein said mobile station further comprises a section for selecting said step size such that results of increasing or decreasing the communication channel quality information represented by said second code and said third code by said step size are closer to said measurement, and
the information on the selected step size is informed to said base station.

18. The communication system according to claim 11, wherein, when said third section sends the information represented by said rough quantization level information, said third section divides the information into a plurality of groups and sends each of the groups at a different timing.

19. A communication method for measuring communication channel qualities of one or more partial bands of a communication band in a downlink channel that is divided into a plurality of partial bands, and sending the measurements to a base station as communication channel quality information via an uplink channel in a mobile station, the method comprising:
representing a measured communication channel quality at a first timing of a first partial band by a first code as communication channel quality information of the first partial band,
representing a measured communication channel quality at the first timing of a second partial band, which is different from the first partial band represented by said first code, by a second code as communication channel quality information of the second partial band by using said first code as a reference, the second code representing a difference in the measured channel communication qualities of the first partial band and the second partial band at the first timing;
transmitting the communication channel quality information represented by said first code and said second code to the base station; and
representing the communication channel quality information at a second timing of the first partial band or the second partial band by a third code by using, as a reference, communication channel quality information of the first partial band or the second partial band measured at a timing prior to the second timing, and
transmitting the communication channel quality information represented by said third code to the base station.

20. A communication method in a communication system for measuring communication channel qualities of one or more partial bands of a communication band in a downlink channel that is divided into a plurality of partial bands in a mobile station and sending the measurements to a base station as communication channel quality information via an uplink channel, said method comprises:
representing a measured communication channel quality at a first timing of a first partial band by a first code as communication channel quality information of the first partial band,
representing a measured communication channel quality at the first timing of a second partial band, which is different from the first partial band represented by said first code, by a second code by using said first code as a reference, the second code representing a difference in the measured channel communication qualities of the first partial band and the second partial band at the first timing;
representing, at the first timing, the communication channel quality information of the second partial band by a third code by using, as a reference, communication channel quality information of the second partial band measured at a timing before the first timing; and
selectively sending information represented by said second code and information represented by said third code.

21. A communication method of a communication system for measuring communication channel qualities of one or more partial bands of a communication band in a downlink channel that is divided into a plurality of partial bands in a mobile station and sending the measurements to a base station as communication channel quality information via an uplink channel, wherein, in said mobile station, said method comprises:
representing communication channel quality information of a partial band represented by a first code or a second code at a prior timing, by a third code by using the communication channel quality information of the partial band represented by said first code or said second code at the prior timing as a reference, said third code representing a difference between communication channel quality of the partial band at a current time and the communication channel quality of the partial band at the prior timing;
representing the communication channel quality of the partial band by quantization level information which is rougher than the quantization level defined in the system; and
selectively sending the information represented by said third code and said quantization level information to the base station,
wherein said quantization level information represents the communication channel quality of the partial band using a smaller number of bits than the number of bits of the quantization level defined in the system.

22. The communication method according to claim 20, wherein the selectively sending step sends the information with a smaller error relative to said measurements among the information represented by said second code and information represented by said third code to said base station as said communication channel quality information.

23. A communication method for measuring communication channel qualities of one or more partial bands of a communication band in a downlink channel that is divided into a plurality of partial bands in a mobile station and sending the measurements to a base station as communication channel quality information via an uplink channel, said method comprises:
representing a communication channel quality of said one or more partial bands by a code based on a first format;
representing a communication channel quality of said one or more partial band by a code based on a second format which is different from said first format; and
selectively sending the information represented by said first format and said second format according to errors between the measured communication channel quality and each code based on said first format and said second format to said base station, wherein the errors represent the measured communication channel qualities of said one or more partial bands relative to the codes based on the first and second format.

24. The communication method according to claim 23, wherein
   a communication channel quality of at least one partial band, which is said measurement, is represented by a first code as communication channel quality information and a communication channel quality of at least one partial band which is different from the partial band represented by said first code, which is said measurement, as communication channel quality information in a second code by using a communication channel quality of any partial band represented by said first code as a reference as said first format; and
   the communication channel quality information of partial bands represented by said first code or said second code is represented by a third code by using communication channel quality information of a partial band represented by said first code or said second code as a reference at a timing before in time as said second format.

25. The communication method according to claim 23, wherein
   the communication channel quality information of partial bands represented by the first code or the second code is represented by a third code by using communication channel quality information of a partial band represented by said first code or said second code as a reference at a timing before in time as said first format; and
   the communication channel qualities of the partial bands, which are said measurements, are represented by quantization level information which is rougher than the quantization level defined in the system as said second format.

26. The communication method according to claim 19, wherein each of said second code and said third code is a code indicating to increase or decrease a communication channel quality, which makes a reference, by a predetermined step size.

27. The communication method according to claim 26, wherein, in said mobile station, said method further comprises:
   selecting said step size such that results of increasing or decreasing the communication channel quality information represented by said second code and said third code by said step size are closer to said measurement, wherein the information on the selected step size is informed to said base station.

28. The communication method according to claim 21, wherein, when the information represented by said rough quantization level information is sent, said information is divided into a plurality of groups and each of the groups is sent at a different timing.

29. A mobile station comprising a measuring section for measuring communication channel qualities of a first and second partial band of a communication band in a downlink channel that is divided into a plurality of partial bands in a mobile communication system and an information sending section for sending the measurements to a base station as communication channel quality information via an uplink channel, wherein said mobile station:
   represents a communication channel quality at a first timing of a first partial band by a first code as communication channel quality information of the first partial band,
   represents a communication channel quality at the first timing of the second partial band, which is different from the first partial band, by a second code as communication channel quality information of the first partial band by using said first code as a reference, the second code representing a difference in the measured channel communication qualities of the first partial band and the second partial band at the first timing,
   transmits the communication channel quality information represented by said first code and said second code to the base station using said information sending section,
   represents the communication channel quality information at a second timing of the first partial band or the second partial band by a third code by using, as a reference, communication channel quality information of the first partial band or the second partial band that is measured at a timing prior to the second timing, and
   sends the communication channel quality information represented by said third code to the base station using said information sending section.

30. A mobile station for measuring communication channel qualities of one or more partial bands of a communication band in a downlink channel that is divided into a plurality of partial bands in a mobile communication system and sending the measurements to a base station as communication channel quality information via an uplink channel, comprising:
   a first section for representing a measured communication channel quality of a first partial band by a first code as communication channel quality information of the first partial band and representing a communication channel quality of a second partial band, which is different from the first partial, by a second code by using said first code as a reference, the second code representing a difference in the measured channel communication qualities of the first partial band and the second partial band at a first timing;
   a second section for representing the communication channel quality information of the first partial band or the second partial band, by a third code by using, as a reference, communication channel quality information of the first partial band or the second partial band determined at a prior time; and
   a third section for selectively sending information obtained by said first section and said second section to the base station.

31. A mobile station for measuring communication channel qualities of one or more partial bands of a communication band in a downlink channel that is divided into a plurality of partial bands in a communication system and sending the measurements to a base station as communication channel quality information via an uplink channel, the mobile station comprising:
   a first section for representing communication channel quality information of a partial band represented by a first code or a second code at a prior timing, by a third code by using, as a reference, the communication channel quality information of the partial band represented by said first code or said second code at the prior timing, the third code representing a difference between the measured channel communication qualities of the partial band at a current time and the prior timing;
   a second section for representing the communication channel quality of the partial band by quantization level information which is rougher than the quantization level defined in the system; and
   a third section for selectively sending the information obtained by said first section and said second section to the base station,
   wherein said quantization level information represents the communication channel quality of the partial band using a smaller number of bits than the number of bits of the quantization level defined in the system.

32. The mobile station according to claim 30, wherein said third section sends the information with a smaller error relative to said measurements among the information obtained by said first section and said second section to said base band as said communication channel quality information.

33. A mobile station for measuring communication channel qualities of one or more partial bands of a communication band in a downlink channel that is divided into a plurality of partial bands in a mobile communication system and sending the measurements to a base station as communication channel quality information via an uplink channel, the mobile station comprising:
a first section for representing a communication channel quality of said one or more partial bands by a code based on a first format;
a second section for representing a communication channel quality of said one or more partial bands by a code based on a second format which is different from said first format; and
a third section for selectively sending information represented by said first format and said second format according to errors between the measured communication channel quality and each code based on said first format and said second format to said base station,
wherein the errors represent the measured communication channel qualities of said one or more partial bands relative to the codes based on the first and second format.

34. The mobile station according to claim 33, wherein
a communication channel quality of at least one partial band, which is said measurement, is represented by a first code as communication channel quality information and a communication channel quality of at least one partial band which is different from the partial band represented by said first code, which is said measurement, by a second code as communication channel quality information by using a communication channel quality of any partial band represented by said first code as a reference as said first format; and
the communication channel quality information of partial bands represented by said first code or said second code is represented by a third code by using communication channel quality information of a partial band represented by said first code or said second code at a timing before in time as a reference as said second format.

35. The mobile station according to claim 33, wherein
the communication channel quality information of partial bands represented by the first code or the second code is represented by a third code by using communication channel quality information of a partial band represented by said first code or said second code as a reference at a timing before in time as said first format; and
the communication channel qualities of the partial bands, which are said measurements, are represented by quantization level information which is rougher than the quantization level defined in the system as said second format.

36. The mobile station according to claim 29, wherein each of said second code and said third code is a code indicating to increase or decrease a communication channel quality, which makes a reference, by a predetermined step size.

37. The mobile station according to claim 36, further comprising a section for selecting said step size such that results of increasing or decreasing the communication channel quality information represented by said second code and said third code by said step size are closer to said measurement, wherein the information on the selected step size is informed to said base station.

38. The mobile station according to claim 31, wherein, when the information represented by said rough quantization level information is sent, said third section divides the information into a plurality of groups and sends each of the groups at a different timing.

39. A base station comprising a section for receiving said first code or said second code and said third code from a mobile station among those according to claim 29, and restoring communication channel quality of said partial band.

40. A base station comprising a section for receiving information by said first format or said second format from the mobile station according to claim 33, and restoring communication channel quality of the partial band.

41. A non-transitory recording medium recording a program for causing a computer to execute a method of a mobile station that measures communication channel qualities of one or more partial bands of a communication band in a downlink channel that is divided into a plurality of partial bands in a mobile communication system and sends the measurements to a base station as communication channel quality information via an uplink channel, the method comprising:
representing a measured communication channel quality at a first timing of a first partial band by a first code as communication channel quality information of the first partial band,
representing a measured communication channel quality at the first timing of a second partial band, which is different from the partial band represented by said first code, by a second code as communication channel quality information of the second partial band by using said first code as a reference, the second code representing a difference in the measured channel communication qualities of the first partial band and the second partial band at the first timing,
transmitting the communication channel quality information represented by said first code and said second code to the base station,
representing a measured communication channel quality at a second timing of said partial bands represented by said first code or said second code by a third code by using, as a reference, communication channel quality information of said partial band represented by said first code or said second code at a timing other than the second timing, and
transmitting the communication channel quality information represented by said third code to the base station.

42. A non-transitory recording medium recording a program for causing a computer to execute a method of a mobile station measuring communication channel qualities of one or more partial bands of a mobile communication band in a downlink channel that is divided into a plurality of partial bands in a mobile communication system and sending the measurements to a base station as communication channel quality information via an uplink channel, the method comprising:
a first process of representing a measured communication channel quality of a first partial band by a first code as communication channel quality information of the first partial band,
representing a measured communication channel quality of a second partial band, which is different from the first partial band represented by said first code, by a second code as communication channel quality information of the first partial band by using said first code as a reference, the second code representing a difference in the measured channel communication qualities of the first partial band and the second partial band at a first timing;

a second process of representing communication channel quality information of the partial bands represented by said first code or said second code by a third code by using communication channel quality information of the partial band represented by said first code or said second code at a prior time as a reference; and a process of alternatively sending the information represented by said first process or said second process to the base station.

43. A non-transitory recording medium recording a program for causing a computer to execute a method of a mobile station measuring communication channel qualities of one or more partial bands of a communication band in a downlink channel that is divided into a plurality of partial bands in a communication system and sending the measurements to a base station as communication channel quality information via an uplink channel, the method comprising:

a first process of representing communication channel quality information of a partial band represented by a first code or a second code at a prior timing, by a third code by using said first code or said second code as a reference, the third code representing a difference between the measured channel communication qualities of the partial band at a current time and at the prior timing;

a second process of representing the communication channel quality of the partial band by quantization level information which is rougher than the quantization level defined in the system; and a third process of alternatively sending the information represented by said first process and said second process to the base station, wherein said quantization level information represents the communication channel quality of the partial band using a smaller number of bits than the number of bits of the quantization level defined in the system.

* * * * *